(12) United States Patent
Oh et al.

(10) Patent No.: US 11,496,187 B2
(45) Date of Patent: *Nov. 8, 2022

(54) METHOD AND APPARATUS FOR TRANSMITTING AND RECEIVING DATA IN A MIMO SYSTEM

(71) Applicant: Electronics and Telecommunications Research Institute, Daejeon (KR)

(72) Inventors: Jong-Ee Oh, Daejeon (KR); Minho Cheong, Daejeon (KR); Sok-Kyu Lee, Daejeon (KR)

(73) Assignee: Electronics and Telecommunications Research Institute, Daejeon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/128,013

(22) Filed: Dec. 19, 2020

(65) Prior Publication Data
US 2021/0126680 A1 Apr. 29, 2021

Related U.S. Application Data

(63) Continuation of application No. 16/524,093, filed on Jul. 28, 2019, now Pat. No. 10,931,337, which is a
(Continued)

(30) Foreign Application Priority Data

Mar. 12, 2010 (KR) .......................... 10-2010-0022122
Jul. 8, 2010 (KR) .......................... 10-2010-0065898
(Continued)

(51) Int. Cl.
*H04B 7/0452* (2017.01)
*H04L 1/00* (2006.01)
(Continued)

(52) U.S. Cl.
CPC ......... *H04B 7/0452* (2013.01); *H04L 1/0083* (2013.01); *H04L 1/08* (2013.01);
(Continued)

(58) Field of Classification Search
CPC ..... H04W 84/12; H04W 4/08; H04W 72/121; H04W 28/06; H04B 7/0452;
(Continued)

(56) References Cited

U.S. PATENT DOCUMENTS 7,055,086 B2   5/2006 Lam
7,062,703 B1   6/2006 Keaney
(Continued)

FOREIGN PATENT DOCUMENTS

JP   2006/050526 A   2/2006
JP   2007-081702 A   3/2007
(Continued)

OTHER PUBLICATIONS

IEEE Std. 802.11-2007 Standard, by IEEE Computer Society ("IEEE 802.11-2007 Standard"), Jun. 12, 2007.
(Continued)

*Primary Examiner* — Sung S Ahn

(57) ABSTRACT

The present invention relates to a method and apparatus for transmitting and receiving data. A data transmission method from a sender terminal to a receiver terminal in a MIMO system using a variable frequency band according to one embodiment of the present invention comprises: repeatedly generating a signal field depending on a frequency band that is applied to the transmission of a data frame; generating a data field including the data; generating a data frame including the signal field and the data field; and transmitting the data frame to the receiver terminal. The present invention is advantageous in that a signal field which is transmitted together with the data being transmitted from the sender
(Continued)

terminal to the receiver terminal in the MIMO system can be sent more efficiently.

20 Claims, 61 Drawing Sheets

Related U.S. Application Data continuation of application No. 15/897,986, filed on Feb. 15, 2018, now Pat. No. 10,374,668, which is a continuation of application No. 14/147,447, filed on Jan. 3, 2014, now Pat. No. 9,900,067, which is a continuation of application No. 13/434,681, filed on Mar. 29, 2012, now Pat. No. 8,654,881, which is a continuation of application No. PCT/KR2011/001742, filed on Mar. 11, 2011.

(30) Foreign Application Priority Data

| | | |
|---|---|---|
| Jul. 9, 2010 | (KR) | 10-2010-0066458 |
| Jul. 14, 2010 | (KR) | 10-2010-0068167 |
| Jul. 27, 2010 | (KR) | 10-2010-0072506 |

(51) Int. Cl.
| | |
|---|---|
| H04L 1/08 | (2006.01) |
| H04L 1/06 | (2006.01) |
| H04L 5/00 | (2006.01) |
| H04W 28/06 | (2009.01) |
| H04W 84/12 | (2009.01) |
| H04B 7/0413 | (2017.01) |

(52) U.S. Cl.
CPC .......... *H04B 7/0413* (2013.01); *H04L 1/0643* (2013.01); *H04L 5/003* (2013.01); *H04L 5/0007* (2013.01); *H04W 28/06* (2013.01); *H04W 84/12* (2013.01)

(58) Field of Classification Search
CPC ....... H04B 7/0413; H04L 1/0083; H04L 1/08; H04L 1/0643; H04L 5/0007; H04L 5/003
See application file for complete search history.

(56) References Cited

U.S. PATENT DOCUMENTS

| | | |
|---|---|---|
| 8,325,644 B2 | 12/2012 | Sampath |
| 8,472,537 B2 | 6/2013 | Browning |
| 8,526,351 B2 | 9/2013 | Fischer |
| 8,599,804 B2 | 12/2013 | Erceg |
| 8,675,575 B2 | 3/2014 | Gong |
| 8,718,169 B2 | 5/2014 | Van Nee |
| 8,867,574 B2 | 10/2014 | Van Nee |
| 9,025,428 B2 | 5/2015 | Jones |
| 9,107,099 B2 | 8/2015 | Erceg |
| 9,397,785 B1 | 7/2016 | Zhang |
| 9,480,018 B2 | 10/2016 | Liu |
| 9,485,783 B2 | 11/2016 | Abraham |
| 9,655,002 B2 | 5/2017 | Zhang |
| 9,860,037 B2 | 1/2018 | Van Zelst |
| 10,931,337 B2 * | 2/2021 | Oh ................. H04B 7/0452 |
| 2005/0152473 A1 | 7/2005 | Maltsev |
| 2009/0031185 A1 | 1/2009 | Xhafa et al. |
| 2009/0310692 A1 | 12/2009 | Kafle et al. |
| 2010/0040158 A1 | 2/2010 | Aggarwal et al. |
| 2010/0260159 A1 | 10/2010 | Zhang et al. |
| 2010/0284393 A1 | 11/2010 | Abraham et al. |
| 2010/0309834 A1 | 12/2010 | Fischer et al. |
| 2011/0032875 A1 * | 2/2011 | Erceg ................. H04L 1/0075 370/328 |
| 2011/0096797 A1 | 4/2011 | Zhang |
| 2011/0207488 A1 | 8/2011 | Gong |
| 2011/0249660 A1 | 10/2011 | Noh et al. |
| 2011/0255620 A1 | 10/2011 | Jones et al. |
| 2011/0299468 A1 | 12/2011 | Van Nee et al. |
| 2011/0299610 A1 | 12/2011 | Gong |
| 2012/0127940 A1 | 5/2012 | Lee et al. |
| 2012/0281774 A1 | 11/2012 | Lee et al. |
| 2012/0327915 A1 | 12/2012 | Kang et al. |

FOREIGN PATENT DOCUMENTS

| | | |
|---|---|---|
| JP | 2008-072275 A | 3/2008 |
| JP | 2013-522950 A | 6/2013 |
| KR | 10-2008-0050536 A | 6/2008 |
| KR | 10-2009-0084997 A | 8/2009 |
| KR | 10-2009-0119857 A | 11/2009 |
| WO | 2006/120979 A | 11/2006 |
| WO | 2006120979 A | 11/2006 |
| WO | 2008/118429 A | 10/2008 |
| WO | 2008118429 A | 10/2008 |
| WO | 2010/003373 A | 1/2010 |
| WO | 2010003373 A | 1/2010 |
| WO | 2010/016596 A | 2/2010 |
| WO | 2011031058 A | 3/2011 |
| WO | 2011/153335 A | 12/2011 |
| WO | 2011/159830 A | 12/2011 |

OTHER PUBLICATIONS

IEEE P802.11n/D11.0, Jun. 2009 Draft Standard, by IEEE802.11 Working Group of the 802 Committee ("IEEE 802.11n-2009").

"IEEE802.11ac Preamble with Legacy 802.11a/n Backward Compatibility," TGac doc. IEEE 802.11-09/0847r0, by Lanante et al. ("IEEE 802.11-09/0847r0"), Jul. 2009.

"Strawmodel 802.11ac Specification Framework," TGac doc. IEEE 802.11-09/0633rl, by van Nee et al. ("IEEE 802.11-09/0633rl"), May 13, 2009.

"RTL Design of 1.2Gbps MIMO WLAN System and Its Business Aspect," by Imashioya et al., published by IEEE ("RTL Design"), Oct. 2009.

"Preamble design aspects for MU-MIMO support," TGac doc. IEEE 802.11-09/1161r0, by Noh et al. ("IEEE 802.11-09/1161r0"), Nov. 13, 2009.

"802.11ac Preamble Discussions," TGac doc. IEEE 802.11-09/1174r0, by Zhang et al. ("IEEE 802.11-09/1174r0"), Nov. 16, 2009.

"Proposal for TGac VHT Format," TGac doc. IEEE 802.11-09/1258r0, by Tu et al. ("IEEE 802.11-09/1258r0"), Nov. 19, 2009.

"GroupID Concept for Downlink MU-MIMO Transmission," TGac doc. IEEE 802.11-10/0073r0, by Kim et al. ("IEEE 802.11-10/0073r0"), Jan. 18, 2010.

"VHT Frame Padding," TGac doc. IEEE 802.11-10/0064r0, by Liu et al. ("IEEE 802.11-10/0064r0"), Jan. 19, 2010.

"Proposed Specification Framework edits for preamble structure and A-MPDU," IEEE 802.11-10/0113r0, by Stacey et al. ("IEEE 802.11-10/0113r0"), Jan. 2010.

"802.11ac Preamble," TGac doc. IEEE 802.11-10/0070r1, by Zhang et al. ("IEEE 802.11-10/0070r1"), Jan. 18, 2010.

"802.11ac Preamble," TGac doc. IEEE 802.11-10/0070r5, by Zhang et al. ("IEEE 802.11-10/0070r5"), Mar. 15, 2010.

"Bits Consideration for Signal fields," TGac doc. IEEE 802.11-10/0382r0, by Kim et al. ("IEEE 802.11-10/0382r0"), Mar. 15, 2010.

"VHT Frame Padding," TGac doc. IEEE 802.11-10/0064r3, by Liu et al. ("IEEE 802.11-10/0064r3"), Mar. 16, 2010.

"802.11ac MAC Frame Length Indication," TGac doc. IEEE 802.11-10/0358r0, by Park et al. ("IEEE 802.11-10/0358r0"), Mar. 16, 2010.

"802.11ac preamble for VHT auto-detection," TGac doc. IEEE 802.11-10/0359r0, by Lee et al. ("IEEE 802.11-10/0359r0"), Mar. 16, 2010.

"Preamble Design aspects for 11ac," TGac doc. IEEE 802.11-10/0363r0, by Noh et al. ("IEEE 802.11-10/0363r0"), Mar. 17, 2010.

"Duration in L-SIG," TGac doc. IEEE 802.11-10/0534r0, by Kim et al. ("IEEE 802.11-10/0534r0"), May 17, 2010.

(56) References Cited

OTHER PUBLICATIONS

"TGac Preamble Auto-detection Comparisons," TGac doc. IEEE 802.11-10/0549r2, by Zhang et al. ("IEEE 802.11-10/0549r2"), May 17, 2010.
"Preamble Parameters," TGac doc. IEEE 802.11-10/0578r1, by van Nee et al. ("IEEE 802.11-10/0578r1"), May 17, 2010.
"Why we need Length Field in VHT SIG," TGac doc. IEEE 802.11-10/0627r00, by Morioka et al. ("IEEE 802.11-10/0627r00"), May 17, 2010.
"802.11ac MAC Frame Length Indication," TGac doc. IEEE 802.11-10/0358r1, by Park et al. ("IEEE 802.11-10/0358r1"), May 18, 2010.
"VHT Frame Padding," TGac doc. IEEE 802.11-10/0064r5, by Liu et al. ("IEEE 802.11-10/0064r5"), May 19, 2010.
"Key Technology Issues for IEEE802.11ac Next Gen. WLAN," by ETRI ("ETRI Key Technology Issues"), Jun. 28, 2010.
"VHT Packet Length Calculation," TGac doc. IEEE 802.11-10/0821r0, by Loc et al. ("IEEE 802.11-10/0821r0"), Jul. 12, 2010.
"802.11ac Preamble," TGac doc. IEEE 802.11-10/876r0, by Sampath et al. ("IEEE 802.11-10/876r0"), Jul. 13, 2010.
"Specification Framework for TGac," TGac doc. IEEE 802.11-09/0992r12, by Stacey et al. ("IEEE 802.11-09/0992r12"), Jul. 14, 2010.
"VHT-SIG-A and VHT-SIG-B Field Structure," TGac doc. IEEE 802.11-10/1052r0, by van Nee et al. ("IEEE 802.11- 10/1052r0"), Sep. 9, 2010.
Defendant's Preliminary Invalidity Contentions submitted on Jul. 22, 2019 for Case No. 2:18-cv-00526 (E.D. Texas).
Intervenor Ericsson Inc.'s Preliminary Invalidity Contentions submitted on Jul. 22, 2019 for Case No. 2:18-cv-00526 (E.D. Texas).
Exhibits W for Defendant's Preliminary Invalidity Contentions submitted on Jul. 22, 2019 for Case No. 2:18-cv-00526 (E.D. Texas).
Appendix W for Defendant's Preliminary Invalidity Contentions submitted on Jul. 22, 2019 for Case No. 2:18-cv-00526 (E.D. Texas).
Exhibits X for Defendant's Preliminary Invalidity Contentions submitted on Jul. 22, 2019 for Case No. 2:18-cv-00526 (E.D. Texas).
Appendix X for Defendant's Preliminary Invalidity Contentions submitted on Jul. 22, 2019 for Case No. 2:18-cv-00526 (E.D. Texas).
Lin X. Cai et al., "A Distributed Multi-User MIMO MAC Protocol for Wireless Local Area Networks", IEEE "GLOBCOM" 2008 proceedings, 2008, pp. 1-5, IEEE.
David Astely et al., "LTE: The Evolution of Mobile Broadband", L TE Part II: 3GPP Release 8, Apr. 2009, pp. 44-51, IEEE.
International Search Report for PCT/KR2011/001742 filed on Mar. 11, 2011.
Joonsuk Kim et al., "Bits Consideration for Signal fields", IEEE, Mar. 2010.
Hongyuan Zhang et al., "802.11ac Preamble Discussions; IEEE 802.11-09/1174r0", IEEE Preamble Discussions, Nov. 16, 2009, pp. 1-10, vol. 802.11ac, IEEE, Piscataway, USA.
Hemanth Sam Path et al., "802.11ac Preamble; IEEE 802.11-10/876r0", IEEE Preamble, Jul. 13, 2010, pp. 1-18, vol. 802.11ac, IEEE, Piscataway, USA.
Extended European Search Report for International Application No. PCT/KR2011 001742, dated Dec. 17, 2012.
"On the Consideration of Technical Candidates for LTE-advanced", 3GPP TSG RAN WG1 Meeting #53, R1-081809, May 9, 2008, pp. 1-12.
Jaewoo Park et al., "802.11ac MAC Frame Length Indication", IEEE 802.11-1 0/0358r1, May 18, 2010, pp. 1-9.
Aon Mujtaba et al., "TGn Sync Complete Proposal," IEEE 802.11-04/887r2, Sep. 2004, pp. 1-46, IEEE.
Leo Nardo Lanante, "IEEE802.11 ac Preamble with Legacy 802.11 a/n Backward Compatibility", doc. : IEEE 802.11-09/0847r1, Nov. 18, 2009.
Syed Aon Mujtaba, "TGn Sync Complete Proposal", doc. : IEEE 802.11-04/887r2, Sep. 2004, slides 1-46.
Hongyuan Zhang et al., "802.11ac Preamble", doc.: IEEE B02.11-10/0070r0, Jan. IB, 2010, pp. 1-11.
Non-final office action dated Jul. 19, 2012 for U.S. Appl. No. 13/434,681.
Final office action dated Mar. 28, 2013 for U.S. Appl. No. 13/434,681.
Notice of Allowance dated Oct. 4, 2013 for U.S. Appl. No. 13/434,681.
Non-final office action dated Sep. 2, 2014 for U.S. Appl. No. 14/147,447.
Final office action dated Mar. 17, 2015 for U.S. Appl. No. 14/147,447.
Non-final office action dated Jun. 30, 2015 for U.S. Appl. No. 14/147,447.
Final office action dated Jan. 7, 2016 for U.S. Appl. No. 14/147,447.
Non-final office action dated Sep. 9, 2016 for U.S. Appl. No. 14/147,447.
Notice of Allowance dated Jun. 5, 2017 for U.S. Appl. No. 14/147,447.
Notice of Allowance dated Sep. 14, 2017 for U.S. Appl. No. 14/147,447.
Non-final office action dated Jul. 6, 2018 for U.S. Appl. No. 15/897,986.
Notice of Allowance dated Mar. 22, 2019 for U.S. Appl. No. 15/897,986.
Non-final office action dated Mar. 6, 2020 for U.S. Appl. No. 16/524,093.
Notice of Allowance dated Dec. 11, 2020 for U.S. Appl. No. 16/524,093.
Complaint filed Mar. 17, 2021 in the Western District of Texas (Waco Division) for Case No. 6:21-cv-00270.
Japanese office action dated Oct. 15, 2021 for Japanese Application No. 2020-126629.
U.S. Appl. No. 16/524,093, Jong-Ee Oh et al., filed Jul. 28, 2019, Pending.
U.S. Appl. No. 15/897,986, Jong-Ee Oh et al., filed Feb. 15, 2018, U.S. Pat. No. 10,374,668.
U.S. Appl. No. 14/147,447, Jong-Ee Oh et al., filed Jan. 3, 2014, U.S. Pat. No. 9,900,067.
U.S. Appl. No. 13/434,681, Jong-Ee Oh et al., filed Mar. 29, 2012, U.S. Pat. No. 8,654,881.

* cited by examiner

FIG. 27
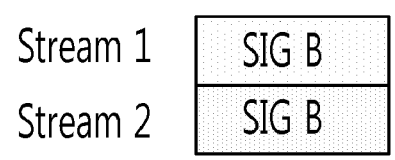
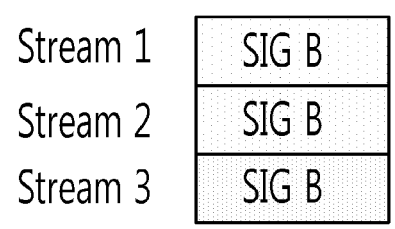
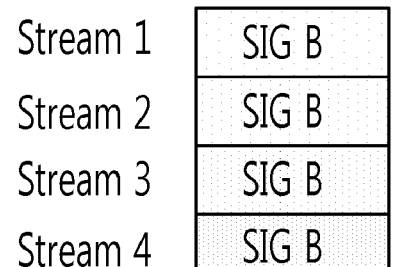

FIG. 38
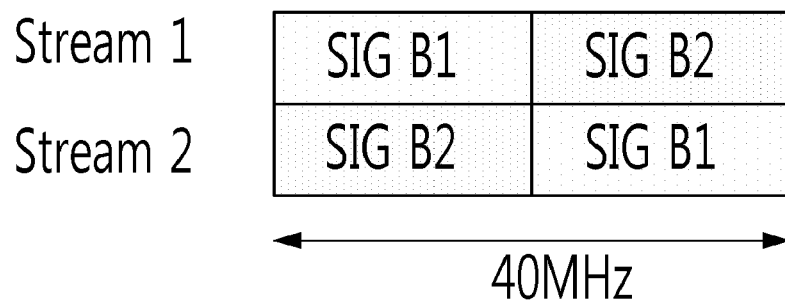
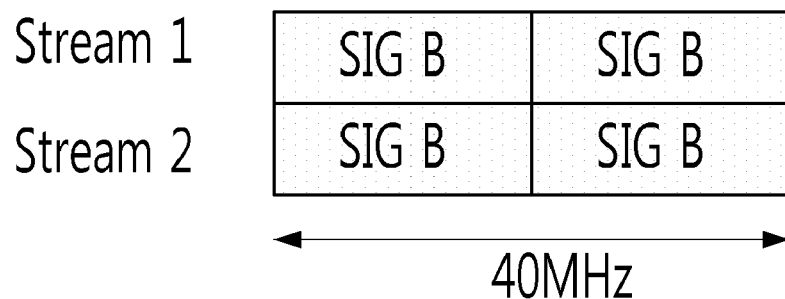

FIG. 39

| | | |
|---|---|---|
| Stream 1 | SIG B1 | SIG B2 |
| Stream 2 | SIG B2 | SIG B1 |
| Stream 3 | SIG B1 | SIG B2 |

← 40MHz →

| | | |
|---|---|---|
| Stream 1 | SIG B | SIG B |
| Stream 2 | SIG B | SIG B |
| Stream 3 | SIG B | SIG B |

← 40MHz →

FIG. 40

| | | |
|---|---|---|
| Stream 1 | SIG B1 | SIG B2 |
| Stream 2 | SIG B2 | SIG B1 |
| Stream 3 | SIG B1 | SIG B2 |
| Stream 4 | SIG B2 | SIG B1 |

←— 40MHz —→

| | | |
|---|---|---|
| Stream 1 | SIG B | SIG B |
| Stream 2 | SIG B | SIG B |
| Stream 3 | SIG B | SIG B |
| Stream 4 | SIG B | SIG B |

←— 40MHz —→

FIG. 42
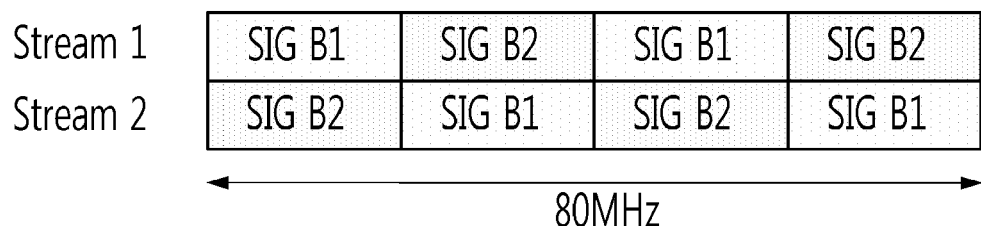
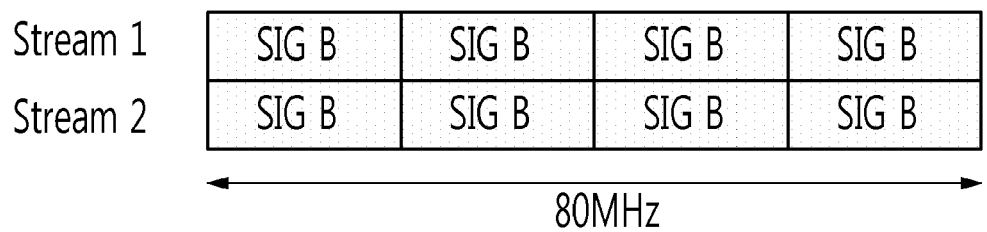

FIG. 43
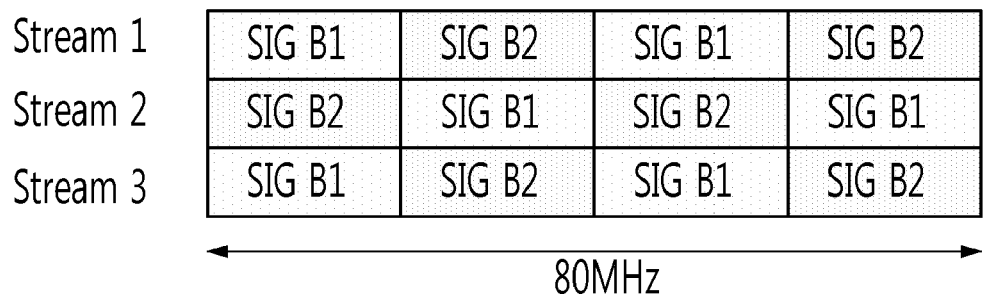
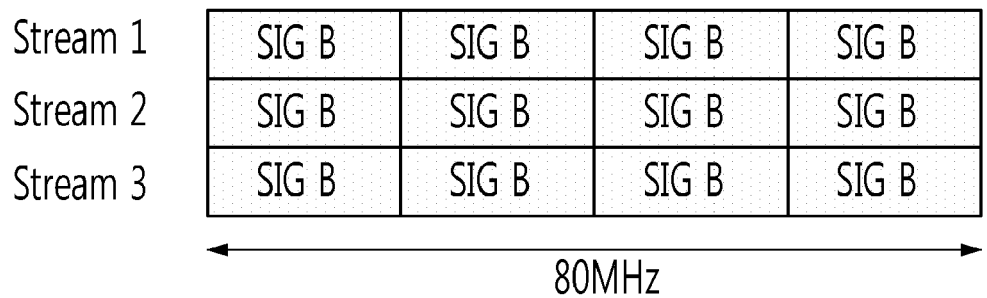

FIG. 44

| Stream 1 | SIG B1 | SIG B2 | SIG B1 | SIG B2 |
|---|---|---|---|---|
| Stream 2 | SIG B2 | SIG B1 | SIG B2 | SIG B1 |
| Stream 3 | SIG B1 | SIG B2 | SIG B1 | SIG B2 |
| Stream 4 | SIG B2 | SIG B1 | SIG B2 | SIG B1 |

←——————— 80MHz ———————→

| Stream 1 | SIG B | SIG B | SIG B | SIG B |
|---|---|---|---|---|
| Stream 2 | SIG B | SIG B | SIG B | SIG B |
| Stream 3 | SIG B | SIG B | SIG B | SIG B |
| Stream 4 | SIG B | SIG B | SIG B | SIG B |

←——————— 80MHz ———————→

FIG. 45

| 20MHz SIG B | MCS 4bits | Length 16bits | Tail 6bits |
| 40MHz SIG B | MCS 4bits | Length 17bits | Tail 6bits |
| 80MHz SIG B | MCS 4bits | Length 19bits | Tail 6bits |

FIG. 48

| Stream 1 | SIG B 29 bits | SIG B 29 bits | SIG B 29 bits | SIG B 29 bits | PAD 1bits |
|---|---|---|---|---|---|
| Stream 2 | SIG B 29 bits | SIG B 29 bits | SIG B 29 bits | SIG B 29 bits | PAD 1bits |
| Stream 3 | SIG B 29 bits | SIG B 29 bits | SIG B 29 bits | SIG B 29 bits | PAD 1bits |
| Stream 4 | SIG B 29 bits | SIG B 29 bits | SIG B 29 bits | SIG B 29 bits | PAD 1bits |

←─────────────── 80MHz ───────────────→

FIG. 50

| | | | |
|---|---|---|---|
| 20MHz SIG B | Length 17bits | Res. 3bits | Tail 6bits |
| 40MHz SIG B | Length 19bits | Res. 2bits | Tail 6bits |
| 80MHz SIG B | Length 21bits | Res. 2bits | Tail 6bits |

FIG. 53

| Stream 1 | SIG B 29 bits | SIG B 29 bits | SIG B 29 bits | SIG B 29 bits | PAD 1bits |
|---|---|---|---|---|---|
| Stream 2 | SIG B 29 bits | SIG B 29 bits | SIG B 29 bits | SIG B 29 bits | PAD 1bits |
| Stream 3 | SIG B 29 bits | SIG B 29 bits | SIG B 29 bits | SIG B 29 bits | PAD 1bits |
| Stream 4 | SIG B 29 bits | SIG B 29 bits | SIG B 29 bits | SIG B 29 bits | PAD 1bits |

←——————————— 80MHz ———————————→

FIG. 57

| Stream 1 | SIG B 29 bits | SIG B 29 bits | SIG B 29 bits | SIG B 29 bits | PAD 1bits |
| Stream 2 | SIG B 29 bits | SIG B 29 bits | SIG B 29 bits | SIG B 29 bits | PAD 1bits |
| Stream 3 | SIG B 29 bits | SIG B 29 bits | SIG B 29 bits | SIG B 29 bits | PAD 1bits |
| Stream 4 | SIG B 29 bits | SIG B 29 bits | SIG B 29 bits | SIG B 29 bits | PAD 1bits |

←──────────────── 80MHz ────────────────→

METHOD AND APPARATUS FOR TRANSMITTING AND RECEIVING DATA IN A MIMO SYSTEM

CROSS-REFERENCE TO RELATED APPLICATIONS

The present application is a continuation of U.S. application Ser. No. 16/524,093, filed on Jul. 28, 2019 (now pending), which is a continuation of U.S. application Ser. No. 15/897,986, filed on Feb. 15, 2018 (now U.S. Pat. No. 10,374,668), which is a continuation of U.S. application Ser. No. 14/147,447, filed on Jan. 3, 2014 (now U.S. Pat. No. 9,900,067), which is a continuation of U.S. application Ser. No. 13/434,681, filed on Mar. 29, 2012 (now U.S. Pat. No. 8,654,881), which is a continuation of International Application Ser. No. PCT/KR2011/001742, filed on Mar. 11, 2011, which claims priority of Korean Patent Application No. 10-2010-0072506, filed on Jul. 27, 2010, Korean Patent Application No. 10-2010-0068167, filed on Jul. 14, 2010, Korean Patent Application No. 10-2010-0066458, filed on Jul. 9, 2010, Korean Patent Application No. 10-2010-0065898, filed on Jul. 8, 2010, Korean Patent Application No. 10-2010-0022122, filed on Mar. 12, 2010, the content of which are incorporated herein by reference in their entirety.

TECHNICAL FIELD

The present invention relates to a method and apparatus for transmitting and receiving data and, more particularly, to a method and apparatus for transmitting and receiving data in a multiple input multiple output (MIMO) system.

BACKGROUND ART

A wireless local area network (WLAN) basically supports a basic service set (BSS) mode including an access point (AP) serving as a connection point of a distribution system (DS) and a plurality of stations (STAs), however, not APs, or an independent BSS (IBSS) mode including only stations (STAs) (hereinafter, AP and STA will be referred to as a 'terminal').

In a wireless communication system using multiple antennas, i.e., a MIMO system, a channel capacity is increased according to an increase in the number of antennas, and frequency efficiency can be enhanced accordingly. The MIMO system may be classified into the following two types of systems: a first one is a single user (SU)-MIMO, in which multiple streams are transmitted only to a single user, and a second one is a multi-user (MU)-MIMO in which multiple streams are transmitted to multiple users by canceling interference between users by an AP.

The MU-MIMO is advantageous in that it can obtain even a multi-user diversity gain along with the increase in channel capacity. Also, the MU-MIMO scheme can simultaneously transmit multiple streams to multiple users by using the same frequency band, increasing throughput in comparison to an existing communication scheme. In general, throughput of the wireless communication system can be increased by increasing the frequency band, but a system cost is disadvantageously increased according to the increase in the frequency band. Meanwhile, the MU-MIMO scheme does not increase the frequency band but its complexity is drastically increased in comparison to the existing communication scheme. Thus, in the standard such as 802.11ac, methods for simultaneously employing the MU-MIMO technique while using a variable frequency according to a surrounding situation have been researched.

In the wireless communication system in which multiple antenna streams are simultaneously transmitted to several users while using a variable frequency band, a data field and a signal field including information regarding the corresponding data field are transmitted. The signal field is divided into the following two types of fields. The first is a common signal field including information commonly applied to users. The second is a dedicated signal field including information individually applied to each user. The common signal field may be recognized by every user who belongs to a common user group or who may not belong to the common user group. Also, the common signal field is used for auto-detection for discriminating by which communication system a transmitted data frame has been generated (namely, it is used for auto-detection for discriminating a communication system by which a transmitted data frame was generated), so that, the common signal field is required to have compatibility. Thus, there is a limitation in changing the format or the configuration of the common signal field.

The common signal field is transmitted through a simple iterative structure to an SNR gain and a frequency diversity gain. However, the dedicated signal field cannot obtain both the SNR gain and the frequency diversity gain although such a simple iterative structure as that of the common signal field is used.

DISCLOSURE

Technical Problem

The present invention provides a method and apparatus for effectively transmitting a signal field which is transmitted together when a transmission terminal transmits data to a reception terminal in a multiple input multiple output (MIMO) system.

The foregoing and other objects, features, aspects and advantages of the present invention will be understood and become more apparent from the following detailed description of the present invention. Also, it can be easily understood that the objects and advantages of the present invention can be realized by the units and combinations thereof recited in the claims.

Technical Solution

In an aspect, a method for transmitting data by a transmission terminal to a reception terminal in a multiple input multiple output (MIMO) system using a variable frequency band includes iteratively generating a signal field according to a frequency band applied to transmission of a data frame, generating a data field including the data, generating a data frame including the signal field and the data field, and transmitting the data frame to the reception terminal.

In another aspect, a method for receiving data by a reception terminal from a transmission terminal in a multiple input multiple output (MIMO) system using a variable frequency band includes receiving a data frame including a signal field and a data field, and obtaining the data included in the data field by using the signal field, wherein the signal field is iteratively included in the signal field according to a frequency band applied to transmission of the data frame.

In another aspect, a transmission device transmitting data to a reception terminal in a multiple input multiple output (MIMO) system using a variable frequency band includes a signal field generation unit iteratively generating a signal field according to a frequency band applied to transmission of a data frame, a data field generation unit generating a data field including the data, a data frame generation unit generating a data frame including the signal field and the data field, and a transmission unit transmitting the data frame to the reception terminal.

In another aspect, a reception device receiving data from a transmission terminal in a multiple input multiple output (MIMO) system using a variable frequency band includes a reception unit receiving a data frame including a signal field and a data field, and a data obtaining unit obtaining the data included in the data field by using the signal field, wherein the signal field is iteratively included in the signal field according to a frequency band applied to transmission of the data frame.

Advantageous Effects

According to embodiments of the present invention, a signal field, which is transmitted together when a transmission terminal transmits data to a reception terminal in a MIMO system, can be effectively transmitted.

Also, in transmitting a dedicated signal field in the MU-MIMO system, the performance of the signal field is enhanced and a transmission time is reduced by utilizing a user's frequency band and the number of streams, whereby a large amount of information can be effectively transmitted by using the signal field.

DESCRIPTION OF DRAWINGS

FIG. 27 shows an embodiment of applying the data transmission method according to the present invention to a case in which data is transmitted by using one QPSK symbol in a 20 MHz frequency band.

FIG. 38 shows an embodiment of applying a data transmission method according to the present invention to a case in which a station (STA) receives two streams in a 40 MHz frequency band.

FIG. 39 shows an embodiment of applying the data transmission method according to the present invention to a case in which a station (STA) receives three streams in a 40 MHz frequency band.

FIG. 40 shows an embodiment of applying the data transmission method according to the present invention to a case in which a station (STA) receives four streams in a 40 MHz frequency band.

FIG. 42 shows an embodiment of applying the data transmission method according to the present invention to a case in which a station (STA) receives two streams in an 80 MHz frequency band.

FIG. 43 shows an embodiment of applying the data transmission method according to the present invention to a case in which a station (STA) receives three streams in an 80 MHz frequency band.

FIG. 44 shows an embodiment of applying the data transmission method according to the present invention to a case in which a station (STA) receives four streams in an 80 MHz frequency band.

FIG. 45 shows a bit allocation of a VHT-SIG B when the VHT-SIG B has a length of 26 bits in a 20 MHz band, has a length of 27 bits in a 40 MHz band, and has a length of 29 bits in an 80 MHz band.

FIG. 48 shows an embodiment of applying the data transmission method according to the present invention to a case in which a station (STA) receives four streams in an 80 MHz frequency band, when the numbers of bits of the VHT-SIG B are allocated as shown in FIG. 45.

FIG. 50 shows a bit allocation of the VHT-SIG B when the VHT-SIG B has a length of 26 bits in a 20 MHz band, 27 bits in a 40 MHz band, and 29 bits in a 80 MHz band in SU-MIMO.

FIG. 53 shows an embodiment of applying the data transmission method according to the present invention to a case in which a station (STA) receives four streams in an 80 MHz frequency band, when the numbers of bits of the VHT-SIG B are allocated as shown in FIG. 50.

MHz frequency band, when a CDD technique is used and different delay is applied to each antenna.

FIG. 57 shows an embodiment of applying the data transmission method according to the present invention to a case in which a station (STA) receives four streams in an 80 MHz frequency band, when a CDD technique is used and different delay is applied to each antenna.

Figure 58:
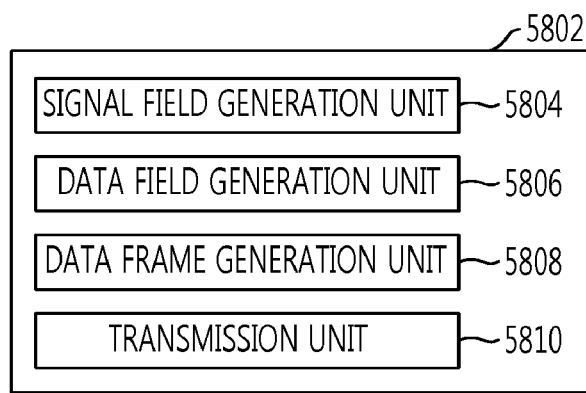

FIG. 58 shows the configuration of a transmission terminal according to an embodiment of the present invention.

Figure 59:
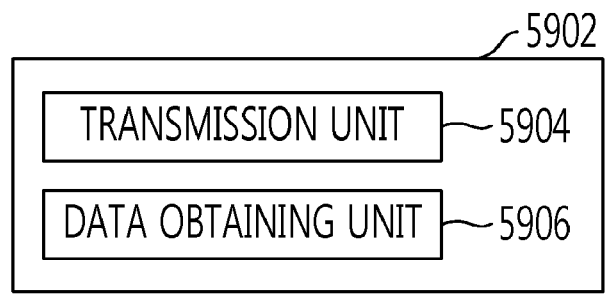

FIG. 59 shows the configuration of a reception terminal according to an embodiment of the present invention.

Figure 60:
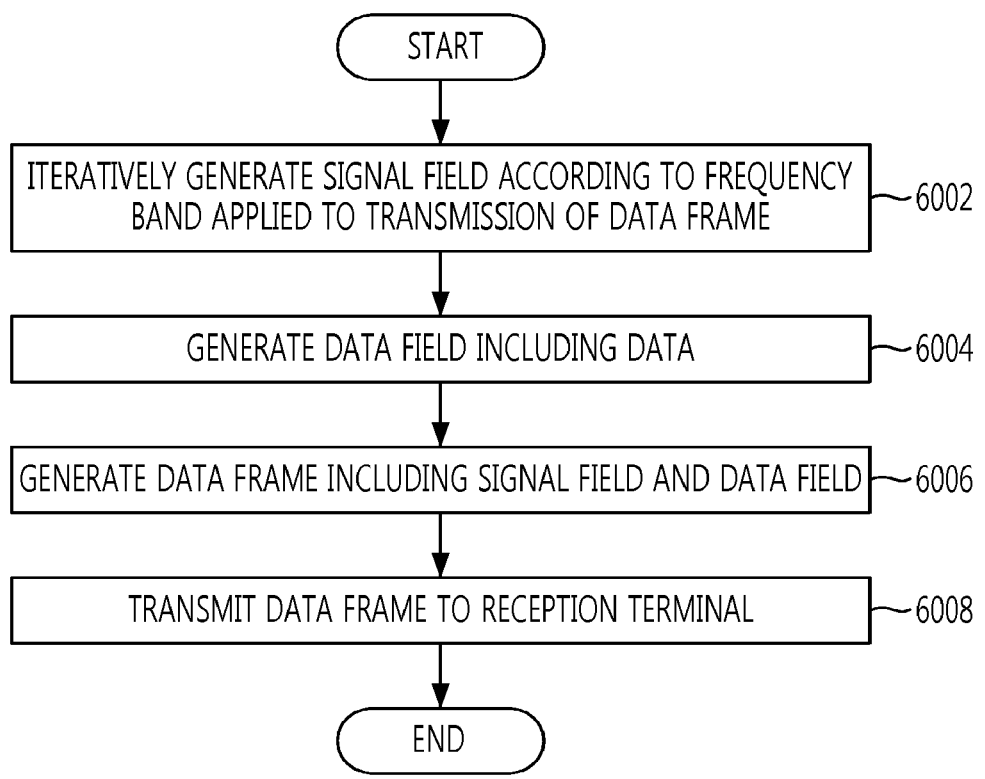

FIG. 60 is a flow chart illustrating an embodiment of a method for transmitting data by a transmission terminal according to an embodiment of the present invention.

Figure 61:
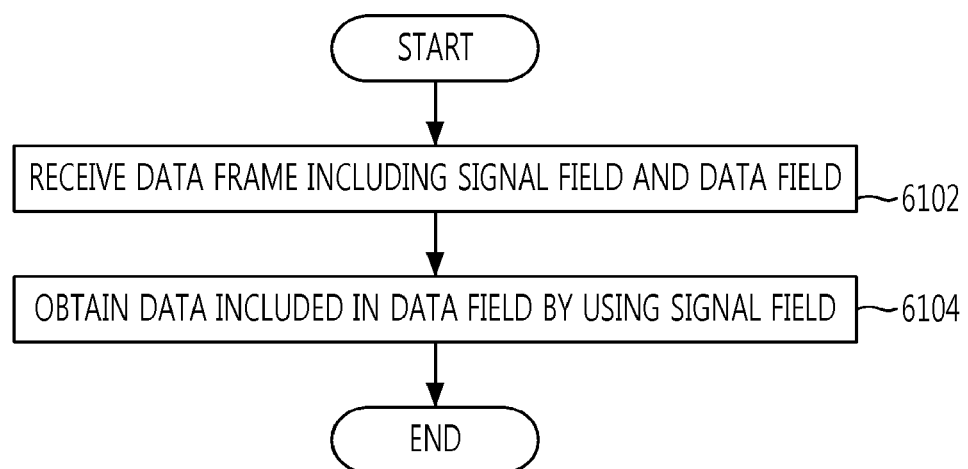

FIG. 61 is a flow chart illustrating an embodiment of a method for receiving data by a reception terminal according to an embodiment of the present invention.

MODE FOR INVENTION

The foregoing and other objects, features, aspects and advantages of the present invention will be described in detail in conjunction with the accompanying drawings, and accordingly, a person skilled in the art to which the present invention pertains will easily implement the technical concept of the present invention. In describing the present invention, if a detailed explanation for a related known function or construction is considered to unnecessarily divert the gist of the present invention, such explanation will be omitted but would be understood by those skilled in the art. The embodiments of the present invention will now be described with reference to the accompanying drawings, in which like numbers refer to like elements in the drawings.

Figure 1:
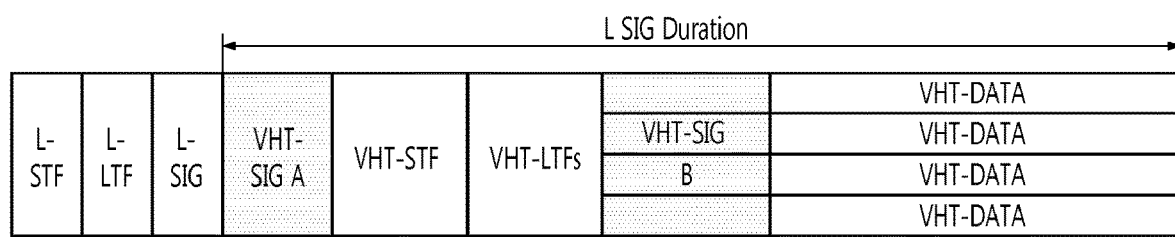
FIG. 1 shows the structure of a data frame used in a data transmission/reception method according to an embodiment of the present invention.

FIG. 1 shows the structure of a data frame used in a data transmission/reception method according to an embodiment of the present invention.

In FIG. 1, L-STF and L-LTF, training fields, and L-SIG, a signal field, are the same as those of a data frame used in an existing 802.11. The frame illustrated in FIG. 1 further includes fields dedicated for high speed wireless communication, i.e., very high throughput (VHT). VHT-STF and VHT-LTF are VHT-dedicated training fields, and VHT-SIG A and VHT-SIG B are VHT-dedicated signal fields.

The data frame of FIG. 1 includes data fields VHT-DATA including data transmitted to several users, respectively. VHT-SIG B includes information regarding each of the data fields. For example, VHT-SIG B may include information regarding the length of useful data included in the VHT-DATA field, information regarding a modulation and coding scheme (MCS) of the VHT-DATA field, and the like. Since the VHT-SIG B field includes information regarding each user, it corresponds to a dedicated signal field. Meanwhile, the VHT-SIG A field is a common signal field transmitted to be recognized by every user.

Figure 2:
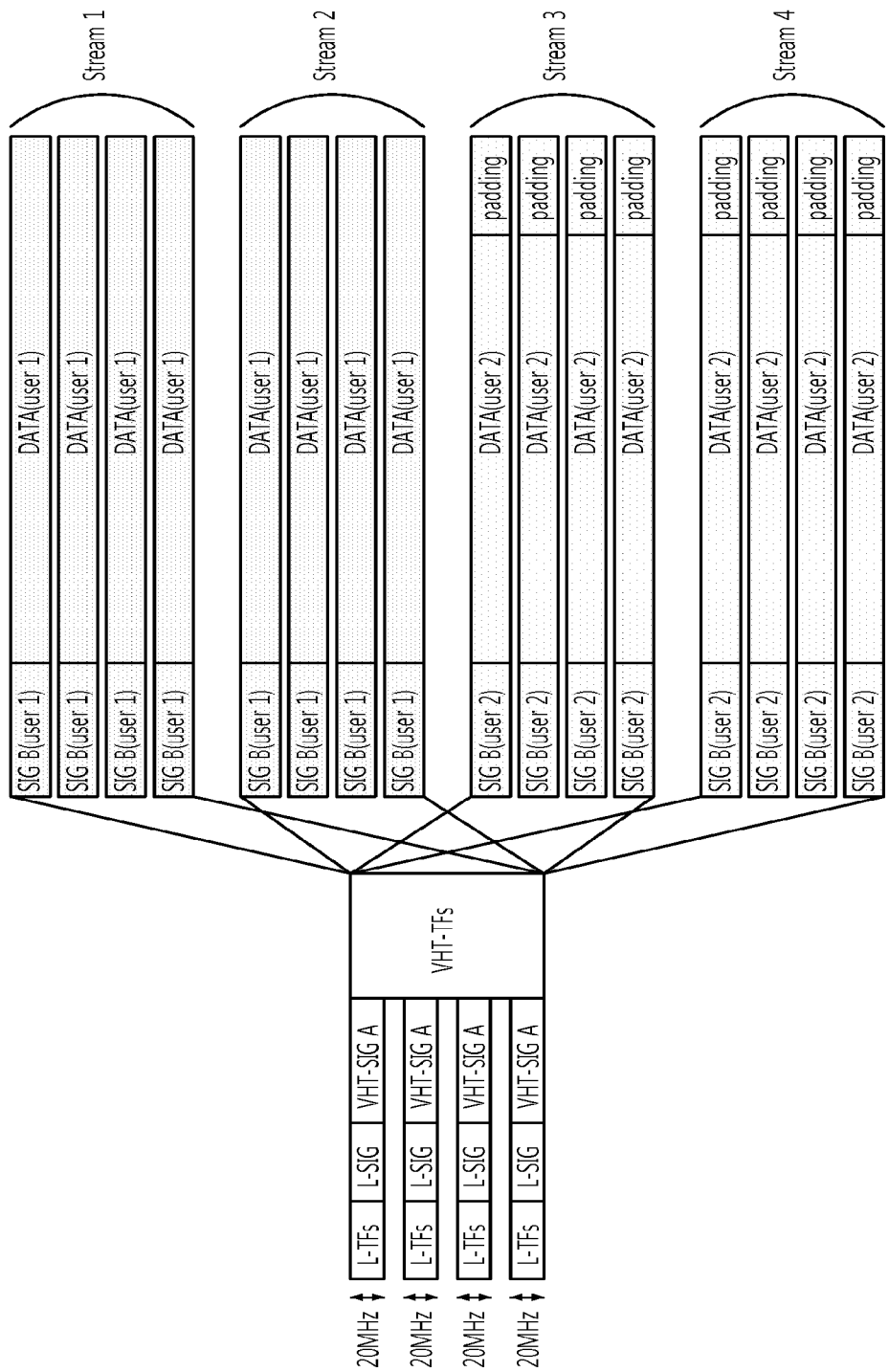
FIG. 2 shows an embodiment in which an access point (AP) transmits four streams through MU-MIMO beamforming by using four antennas in an 80 MHz frequency band and two stations (STA) receive the streams by using two antennas, respectively.

FIG. 2 shows an embodiment in which an access point (AP) transmits four streams through MU-MIMO beamforming by using four antennas in an 80 MHz frequency band and two stations (STA) receive the streams by using two antennas, respectively.

In the embodiment of FIG. 2, VHT-SIG A field, a common signal field, is iterated four times so as to be transmitted as one stream, and MU-MIMO is not applied to this transmission. In FIG. 2, the presence of the L-SIG field in front of VHT-SIG A field is to maintain backward compatibility with existing legacy equipment. A VHT-TF field is used to perform channel estimation in using MU-MIMO beamforming, and may have a resolvable or non-resolvable form.

VHT-SIG A includes common information commonly applied to two stations (STA). Also, VHT-SIG A, having a different structure from a signal field generated in legacy equipment, is used for auto-detection of VHT equipment. Here, VHT-SIG A is simply iteratively transmitted in units of 20 MHz frequency, whereby both an SNR gain and a frequency diversity gain can be obtained.

In comparison, VHT-SIG B, a dedicated-signal field, including information applied to each of the stations STA, is transmitted. Thus, VHT-SIG B is not required to be transmitted by using the simple iterative structure like the VHT-SIG A does. Also, even when VHT-SIG B is transmitted by using the simple iterative structure like VHT-SIG A, VHT-SIG B cannot obtain both an SNR gain and a frequency diversity gain.

In order to solve the problems, the present invention provides a method, apparatus, and a data field configuration capable of enhancing transmission efficiency by using a new method, rather than the simple iterative method like the existing VHT-SIG A field in transmitting the VHG-SIG B field.

Figure 3:
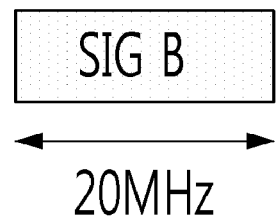
FIG. 3 shows the structure of a VHT-SIG B field when a station (STA) receives one stream in a 20 MHz frequency band.

FIG. 3 shows a structure of the VHT-SIG B field when a station (STA) receives one stream in a 20 MHz frequency band. Here, the VHT-SIG B (referred to as an 'SIG B', hereinafter) is modulated according to BPSK and has one OFDM symbol. In FIG. 3, since there is only one SIG B, it may be transmitted as it is.

Figure 4:
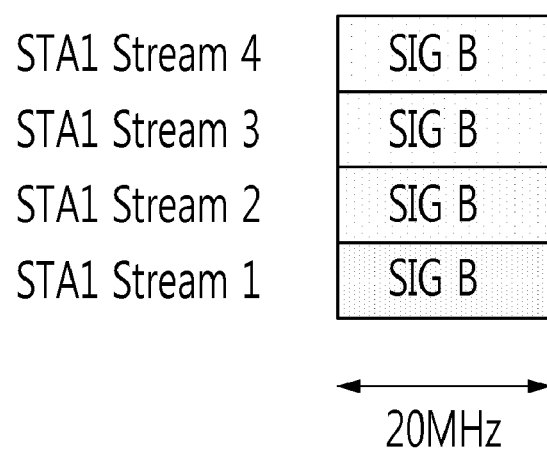
FIG. 4 shows the structure of a VHT-SIG B field when a station (STA) receives four streams in a 20 MHz frequency band.

FIG. 4 shows a structure of the VHT-SIG B field when a station (STA) receives four streams in a 20 MHz frequency band. In the embodiment of FIG. 4, four SIG Bs are transmitted. Here, in case in which the SIG B is transmitted in a simple iterative manner like the VHT-SIG A, if a channel environment of particular subcarriers of OFDM becomes worse in MU-MIMO beamforming, the iterative four bits are all placed in the same situation. Thus, an SNR gain according to the iteration four times may be obtained, but a frequency diversity effect cannot be obtained.

Thus, in an embodiment of the present invention, different interleaving is applied to the SIG Bs of the stream 1 to stream 4. When the same bits of a coded codeword of the SIG Bs is included in a different subcarrier of a different stream and transmitted, both the SNR gain and the frequency diversity gain can be obtained, improving transmission performance.

Figure 5:
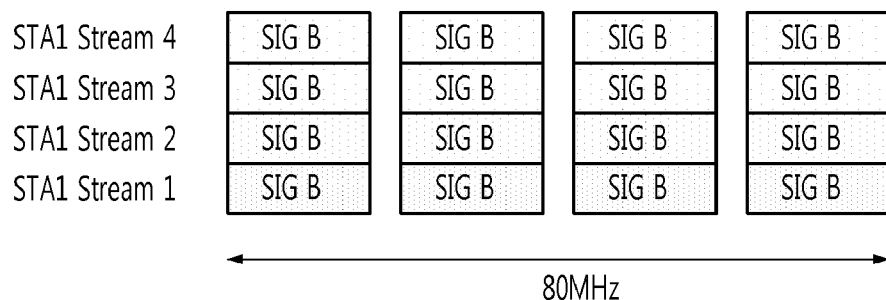
FIG. 5 shows the structure of a VHT-SIG B field when a station (STA) receives four streams in an 80 MHz frequency band.

FIG. 5 shows a structure of the VHT-SIG B field when a station (STA) receives four streams in an 80 MHz frequency band. In the embodiment of FIG. 5, although the SIG B is simply iterated in a frequency band, both the SNR gain and the frequency diversity gain can be obtained. Thus, maximum performance can be obtained by simply iterating the scheme applied to the four streams in the embodiment of FIG. 4.

The method described with reference to FIGS. 4 and 5 may be applied in the same manner to 40 MHz frequency band or 160 MHz band and when the number of streams is two or three.

Meanwhile, information included in the VHT-SIG B field is required to be stably transmitted compared with information included in the VHT-DATA field. Thus, in general, the VHT-SIG B field is transmitted by using a BPSK modulation and a low coding rate, or the like, thus being protected. Thus, the method described with reference to FIGS. 4 and 5 may protect the VHT-SIG B more than necessary.

In the case of VHT-SIG A, it must be necessarily recognized in units of 20 MHz at a receiver (or a receiving end). Thus, the VHT-SIG A must be iteratively transmitted by a corresponding symbol length regardless of the number of symbols. However, iteratively transmitting the VHT-SIG B by a corresponding symbol length may be problematic in terms of the foregoing transmission performance and efficiency.

Figure 6:
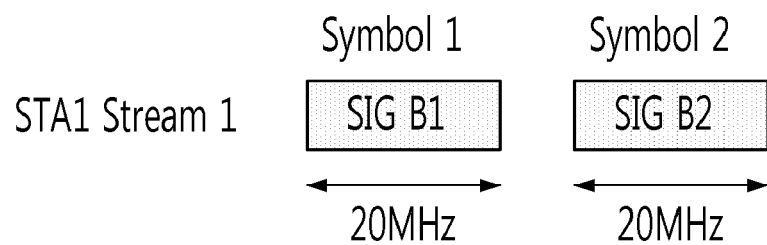
FIG. 6 shows the structure of a VHT-SIG B field having two symbols when a station (STA) receives one stream in a 20 MHz frequency band.

FIG. 6 shows a structure of the VHT-SIG B field having two symbols when a station (STA) receives one stream in a 20 MHz frequency band. In FIG. 6, the SIG B is modulated according to BPSK and has two OFDM symbols. Here, since there is only one SIG B, it may be transmitted as it is.

Figure 7:
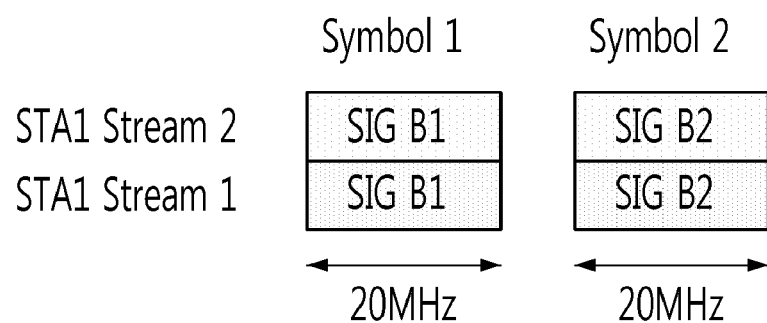
FIG. 7 shows the structure of a VHT-SIG B field having two symbols when a station (STA) receives four streams in a 20 MHz frequency band.

FIG. 7 shows a structure of a VHT-SIG B field having two symbols when a station (STA) receives four streams in a 20 MHz frequency band. Like the embodiment of FIG. 4, both SNR gain and frequency diversity gain can be obtained by applying different interleaving to streams.

However, if sufficient performance can be obtained without having to iterate the SIG B, the method of FIG. 7 may not be an effective transmission because the SIG B is transmitted over two symbols. Thus, the following transmission method is considered.

Figure 8:
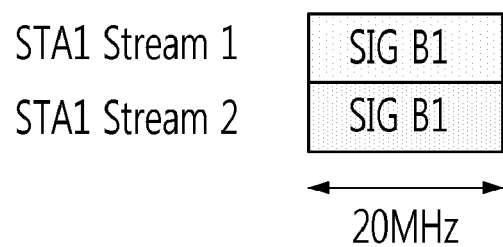
FIG. 8 shows the structure of a VHT-SIG B field having one symbol when a station (STA) receives four streams in a 20 MHz frequency band.

FIG. 8 shows a structure of the VHT-SIG B field having one symbol when a station (STA) receives four streams in a 20 MHz frequency band. In the embodiment of FIG. 8, the SIG B information, which has occupied two symbols when transmitted as one stream in the 20 MHz frequency band, can be effectively transmitted by only one symbol.

Figure 9:
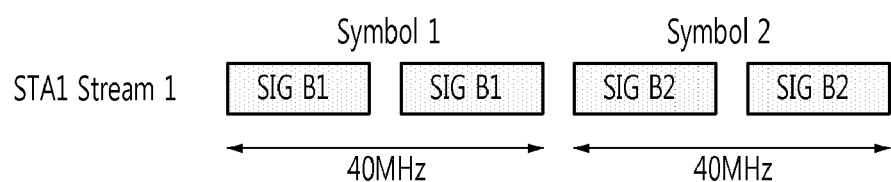
FIG. 9 shows an embodiment in which SIG Bs are transmitted over two symbols in a similar manner to that of a VHT-SIG A when a station (STA) receives one stream in a 40 MHz frequency band.

When the frequency band applied to a transmission of a data frame extends, a method similar to FIG. 8 may be considered. FIG. 9 shows an embodiment in which SIG Bs are transmitted over two symbols in a similar manner to that of a VHT-SIG A when a station (STA) receives one stream in a 40 MHz frequency band. In the embodiment of FIG. 9, since SIG Bs are transmitted over two symbols although sufficient performance can be obtained without iterating the SIG B, it is not effective.

Figure 10:
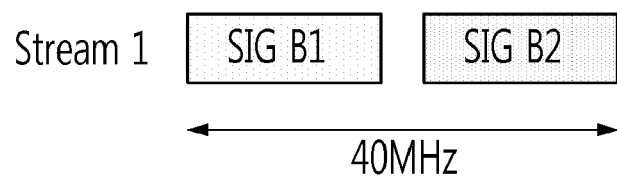
FIG. 10 shows the structure of a VHT-SIG B field having one symbol when a station (STA) receives one stream in a 40 MHz frequency band.

FIG. 10 shows a structure of the VHT-SIG B field having one symbol when a station (STA) receives one stream in a 40 MHz frequency band. In this case, the SIG B information, which has occupied two symbols when transmitted as one stream in the 40 MHz frequency band, can be effectively transmitted through one symbol.

In this manner, when the VHT-SIG B has two symbols when transmitted as one stream in the 20 MHz frequency band, even though the number of streams is increased or the frequency band extends, the VHT-SIG B can be effectively transmitted by using one symbol. Also, the foregoing methods may extend as follows.

Figure 11:
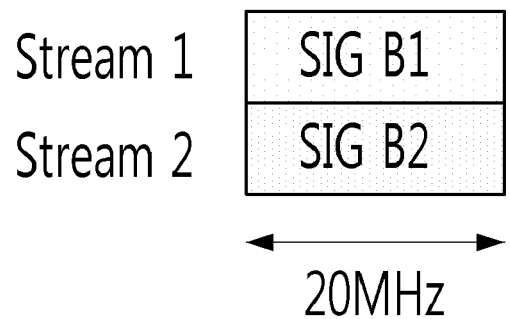
FIG. 11 shows an embodiment of applying a data transmission method according to the present invention to a case in which a station (STA) receives two streams in a 20 MHz frequency band.
Figure 12:
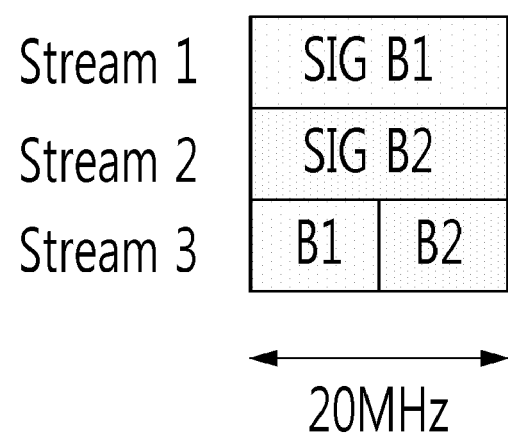
FIG. 12 shows an embodiment of applying the data transmission method according to the present invention to a case in which a station (STA) receives three streams in a 20 MHz frequency band.

FIG. 11 shows an embodiment of applying the data transmission method according to the present invention to a case in which a station (STA) receives two streams in a 20 MHz frequency band. FIG. 12 shows an embodiment of applying the data transmission method according to the present invention to a case in which a station (STA) receives three streams in a 20 MHz frequency band. In the embodiment of FIG. 12, stream 3 is configured of B1 corresponding to an even number bit of a codeword of the SIG B1 and B2 corresponding to an odd number bit of a codeword of SIG B2. The stream 3 transmitted thusly may be combined at a receiver.

Figure 13:
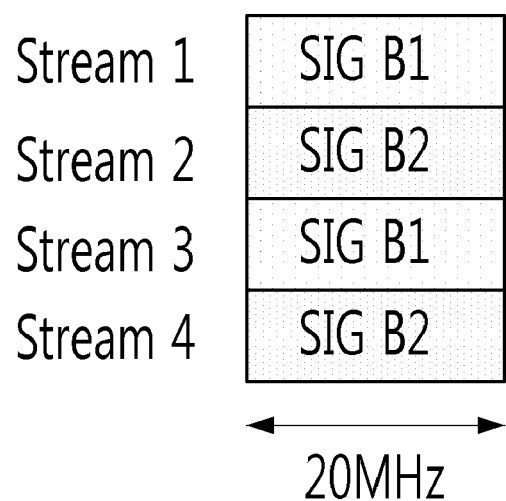
FIG. 13 shows an embodiment of applying the data transmission method according to the present invention to a case in which a station (STA) receives four streams in a 20 MHz frequency band.

FIG. 13 shows an embodiment of applying the data transmission method according to the present invention to a case in which a station (STA) receives four streams in a 20 MHz frequency band. In the embodiment of FIG. 13, SIG B1 is iterated in streams 1 and 3, and SIG B2 is iterated in streams 2 and 4. In this case, a simple iteration cannot obtain a frequency diversity gain, so different interleaving may be applied to each stream in order to enhance transmission performance as mentioned above.

Figure 14:
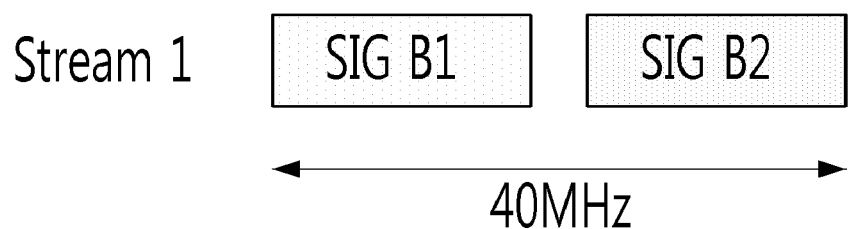
FIG. 14 shows an embodiment of applying the data transmission method according to the present invention to a case in which a station (STA) receives one stream in a 40 MHz frequency band.
Figure 15:
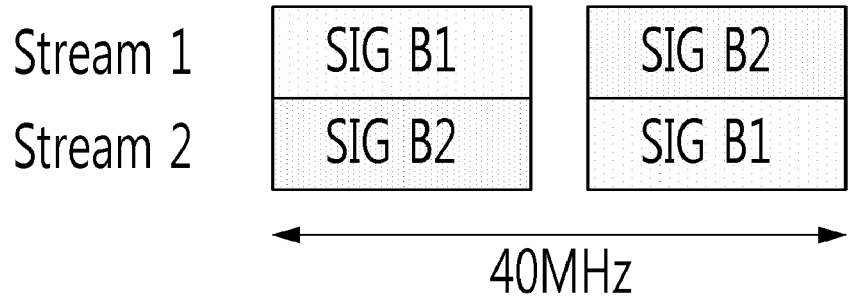
FIG. 15 shows an embodiment of applying the data transmission method according to the present invention to a case in which a station (STA) receives two streams in a 40 MHz frequency band.
Figure 16:
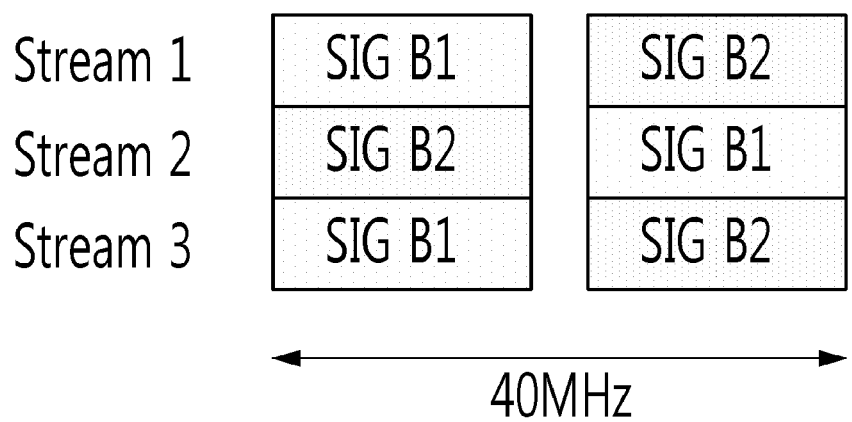
FIG. 16 shows an embodiment of applying the data transmission method according to the present invention to a case in which a station (STA) receives three streams in a 40 MHz frequency band.

FIG. 14 shows an embodiment of applying the data transmission method according to the present invention to a case in which a station (STA) receives one stream in a 40 MHz frequency band. FIG. 15 shows an embodiment of applying the data transmission method according to the present invention to a case in which a station (STA) receives two streams in a 40 MHz frequency band. FIG. 16 shows an embodiment of applying the data transmission method according to the present invention to a case in which a station (STA) receives three streams in a 40 MHz frequency band. Different interleaving may be applied to each stream of FIGS. 14, 15, and 16.

Figure 17:
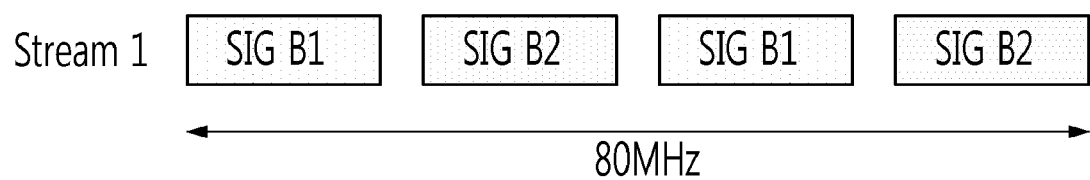
FIG. 17 shows an embodiment of applying the data transmission method according to the present invention to a case in which a station (STA) receives one stream in an 80 MHz frequency band.
Figure 18:
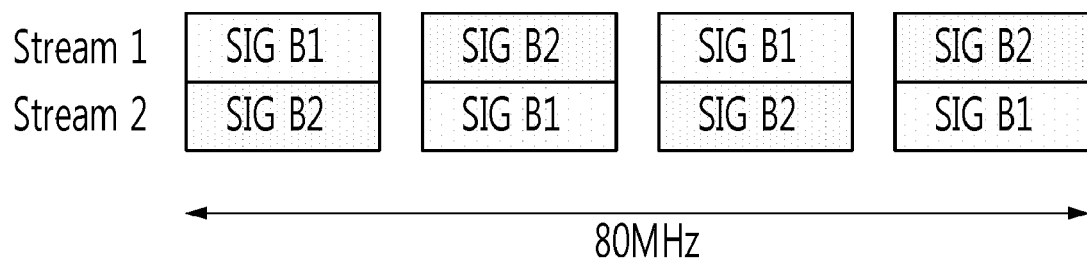
FIG. 18 shows an embodiment of applying the data transmission method according to the present invention to a case in which a station (STA) receives two streams in an 80 MHz frequency band.
Figure 19:
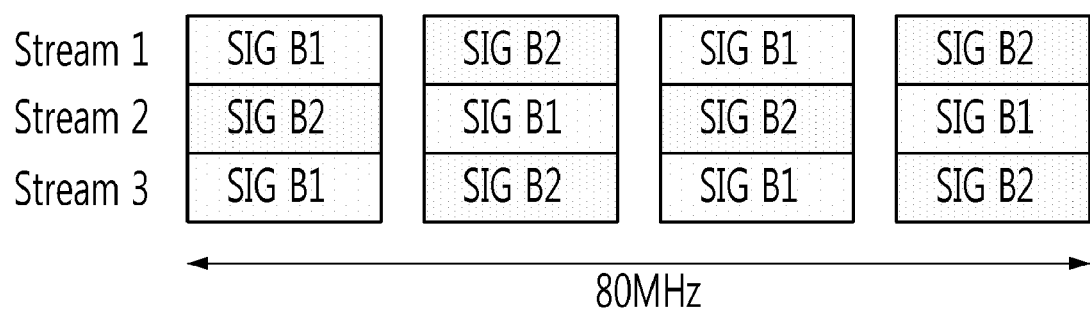
FIG. 19 shows an embodiment of applying the data transmission method according to the present invention to a case in which a station (STA) receives three streams in an 80 MHz frequency band.
Figure 20:
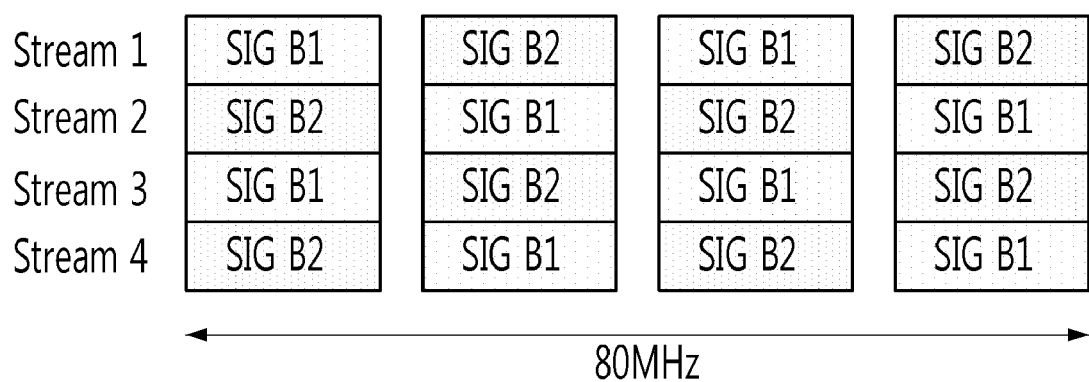
FIG. 20 shows an embodiment of applying the data transmission method according to the present invention to a case in which a station (STA) receives four streams in an 80 MHz frequency band.

FIG. 17 shows an embodiment of applying the data transmission method according to the present invention to a case in which a station (STA) receives one stream in an 80 MHz frequency band. FIG. 18 shows an embodiment of applying the data transmission method according to the present invention to a case in which a station (STA) receives two streams in an 80 MHz frequency band. FIG. 19 shows an embodiment of applying the data transmission method according to the present invention to a case in which a station (STA) receives three streams in an 80 MHz frequency band. FIG. 20 shows an embodiment of applying the data transmission method according to the present invention to a case in which a station (STA) receives four streams in an 80 MHz frequency band. Different interleaving may be applied to each stream of FIGS. 17, 18, 19, and 20.

Figure 21:
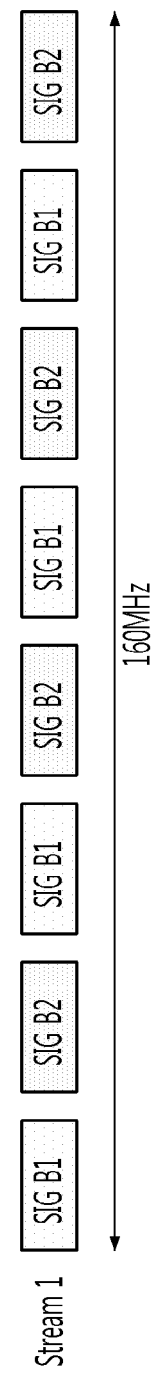
FIG. 21 shows an embodiment of applying the data transmission method according to the present invention to a case in which a station (STA) receives one stream in a 160 MHz frequency band.
Figure 22:
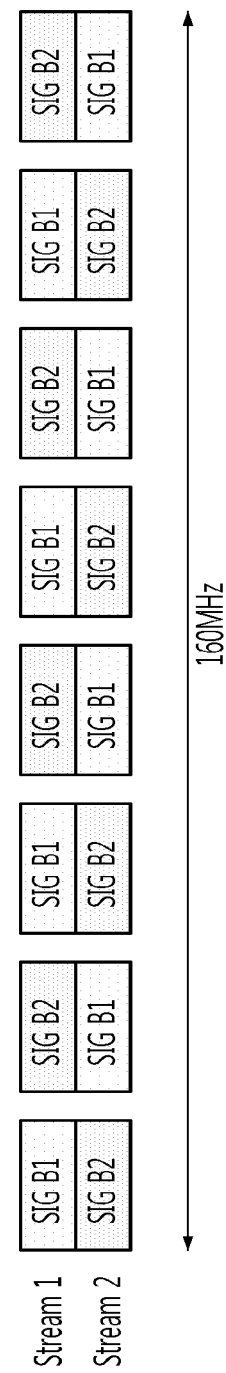
FIG. 22 shows an embodiment of applying the data transmission method according to the present invention to a case in which a station (STA) receives two streams in a 160 MHz frequency band.
Figure 23:
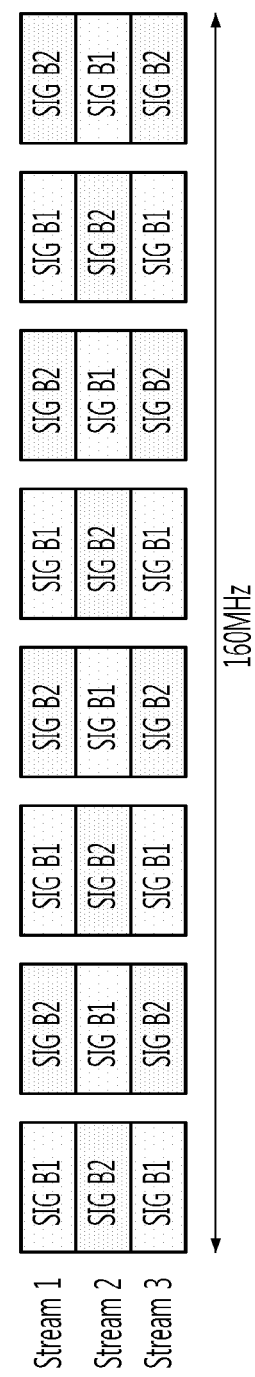
FIG. 23 shows an embodiment of applying the data transmission method according to the present invention to a case in which a station (STA) receives three streams in a 160 MHz frequency band.
Figure 24:
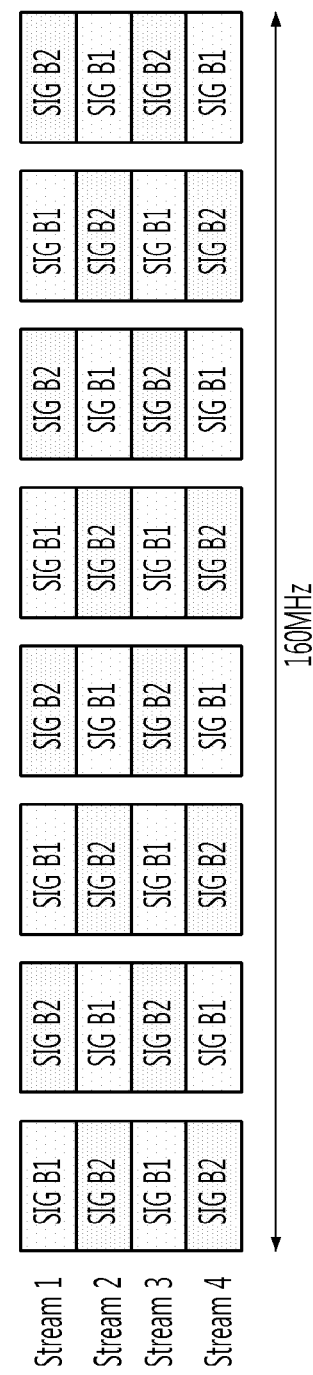
FIG. 24 shows an embodiment of applying the data transmission method according to the present invention to a case in which a station (STA) receives four streams in a 160 MHz frequency band. Different interleaving may be applied to each stream of FIGS. 21, 22, 23, and 24.

FIG. 21 shows an embodiment of applying the data transmission method according to the present invention to a case in which a station (STA) receives one stream in a 160 MHz frequency band. FIG. 22 shows an embodiment of applying the data transmission method according to the present invention to a case in which a station (STA) receives two streams in a 160 MHz frequency band. FIG. 23 shows an embodiment of applying the data transmission method according to the present invention to a case in which a station (STA) receives three streams in a 160 MHz frequency band. FIG. 24 shows an embodiment of applying the data transmission method according to the present invention to a case in which a station (STA) receives four streams in a 160 MHz frequency band. Different interleaving may be applied to each stream of FIGS. 21, 22, 23, and 24.

Figure 25:
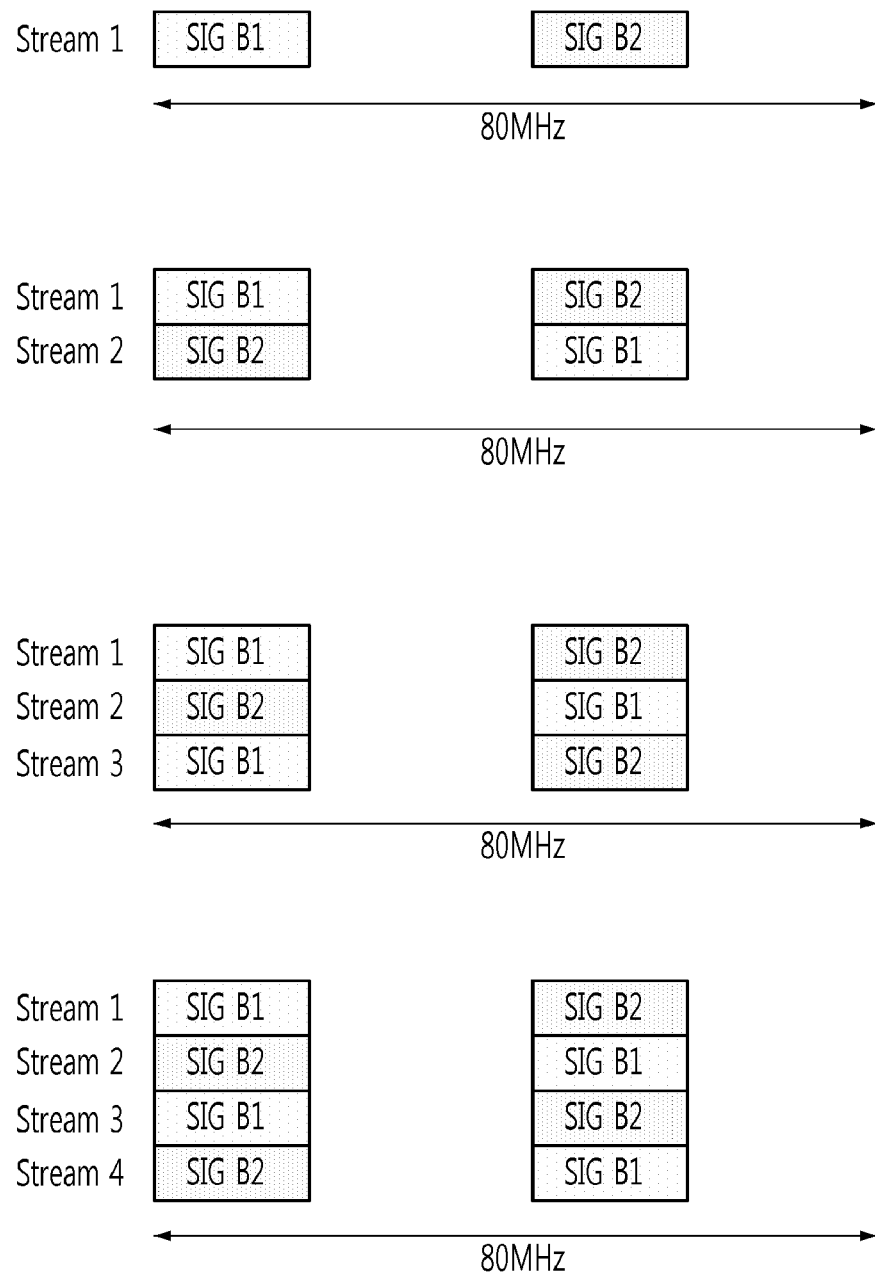
FIG. 25 shows an embodiment of applying the data transmission method according to the present invention to a case in which data is transmitted via two non-contiguous multi-channels in an 80 MHz frequency band.
Figure 26:
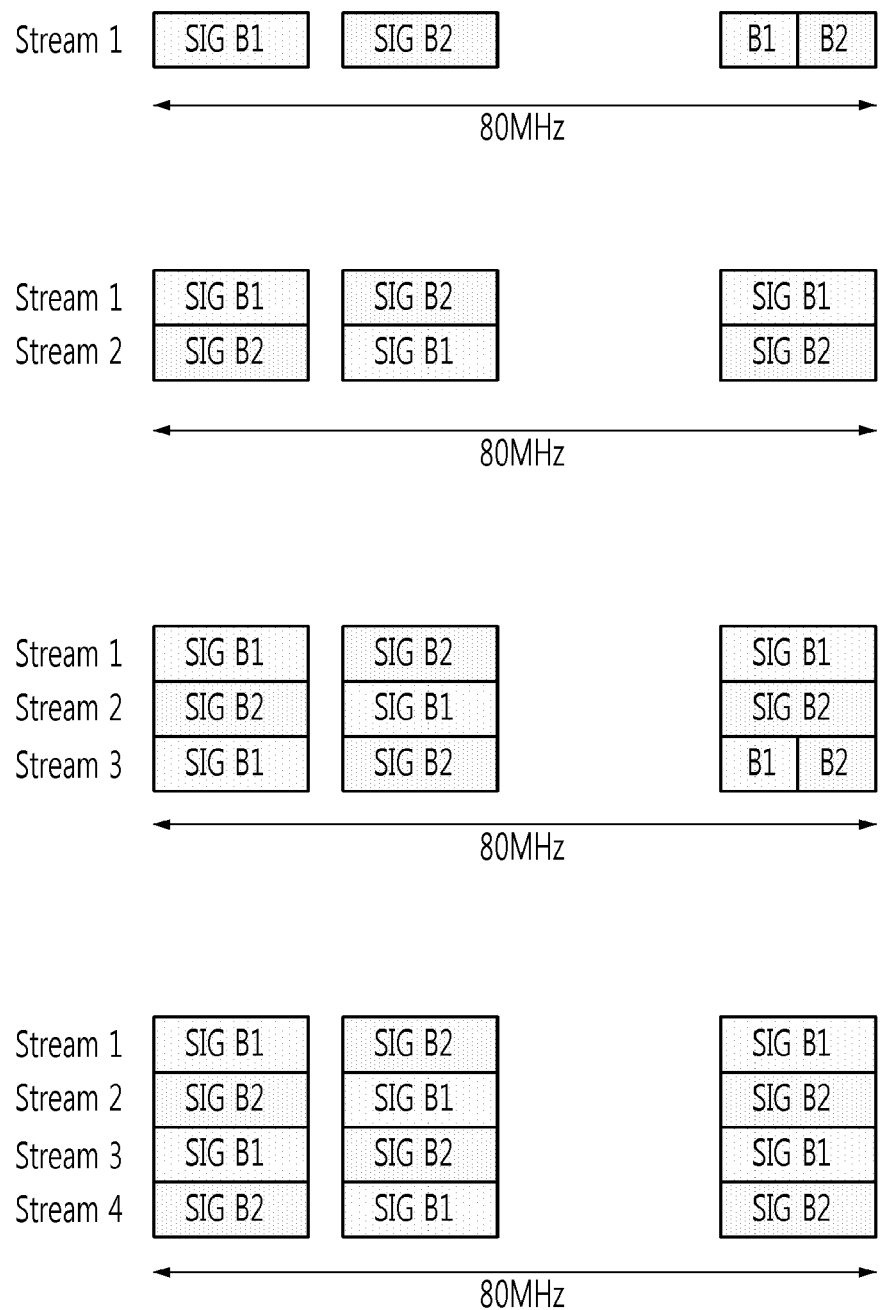
FIG. 26 shows an embodiment of applying the data transmission method according to the present invention to a case in which data is transmitted via three non-contiguous multi-channels in an 80 MHz frequency band.

The transmission method according to an embodiment of the present invention as described above can be applicable when a data frame is transmitted by using a multi-channel. FIG. 25 shows an embodiment of applying the data transmission method according to the present invention to a case in which data is transmitted via two non-contiguous multi-channels in an 80 MHz frequency band. FIG. 26 shows an embodiment of applying the data transmission method according to the present invention to a case in which data is transmitted via three non-contiguous multi-channels in an 80 MHz frequency band. Different interleaving may be applied to each stream of FIGS. 25 and 26.

Figure 28:
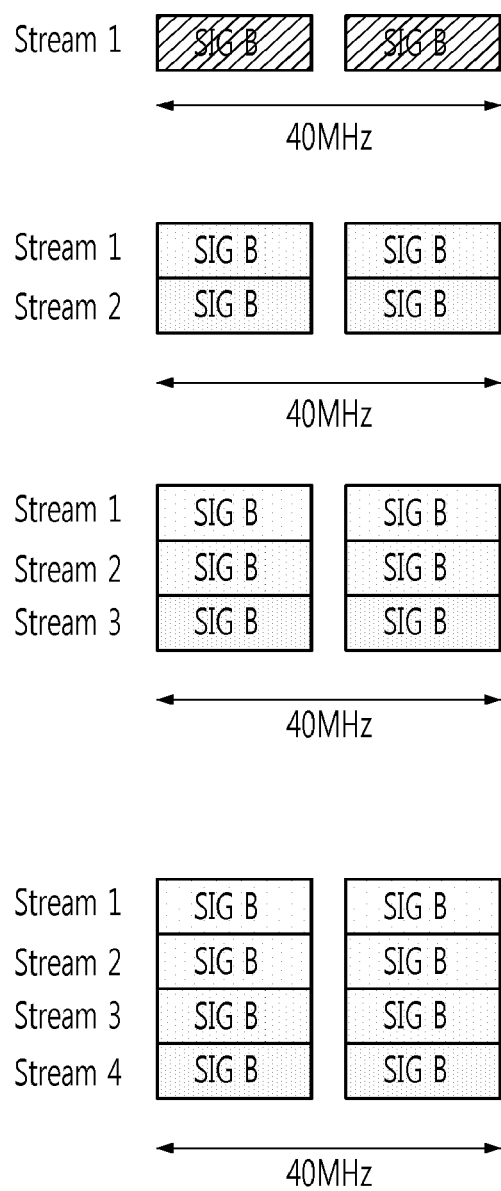
FIG. 28 shows an embodiment of applying the data transmission method according to the present invention to a case in which data is transmitted by using one QPSK symbol in a 40 MHz frequency band.
Figure 29:
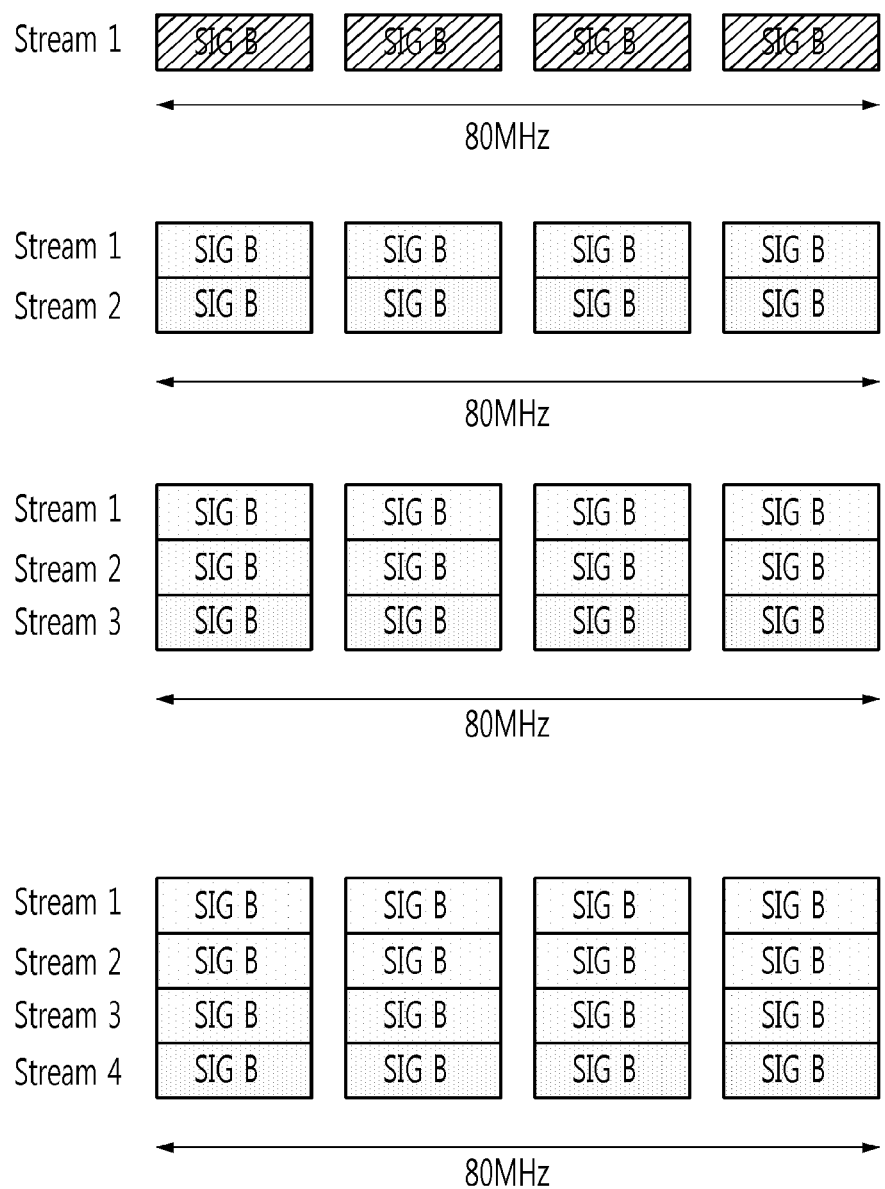
FIG. 29 shows an embodiment of applying the data transmission method according to the present invention to a case in which data is transmitted by using one QPSK symbol in an 80 MHz frequency band.
Figure 30:
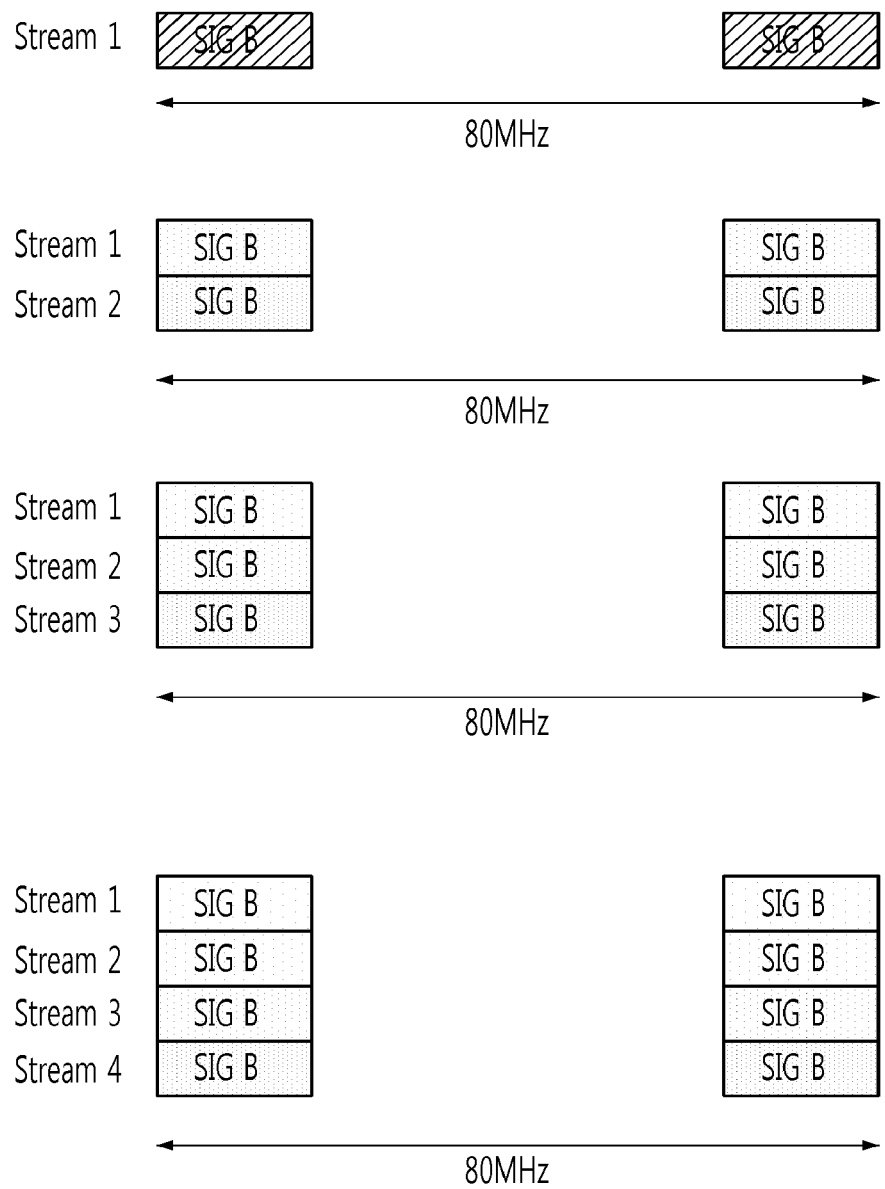
FIG. 30 shows an embodiment of applying the data transmission method according to the present invention to a case in which data is transmitted via two non-contiguous multi-channels by using one QPSK symbol in an 80 MHz frequency band.
Figure 31:
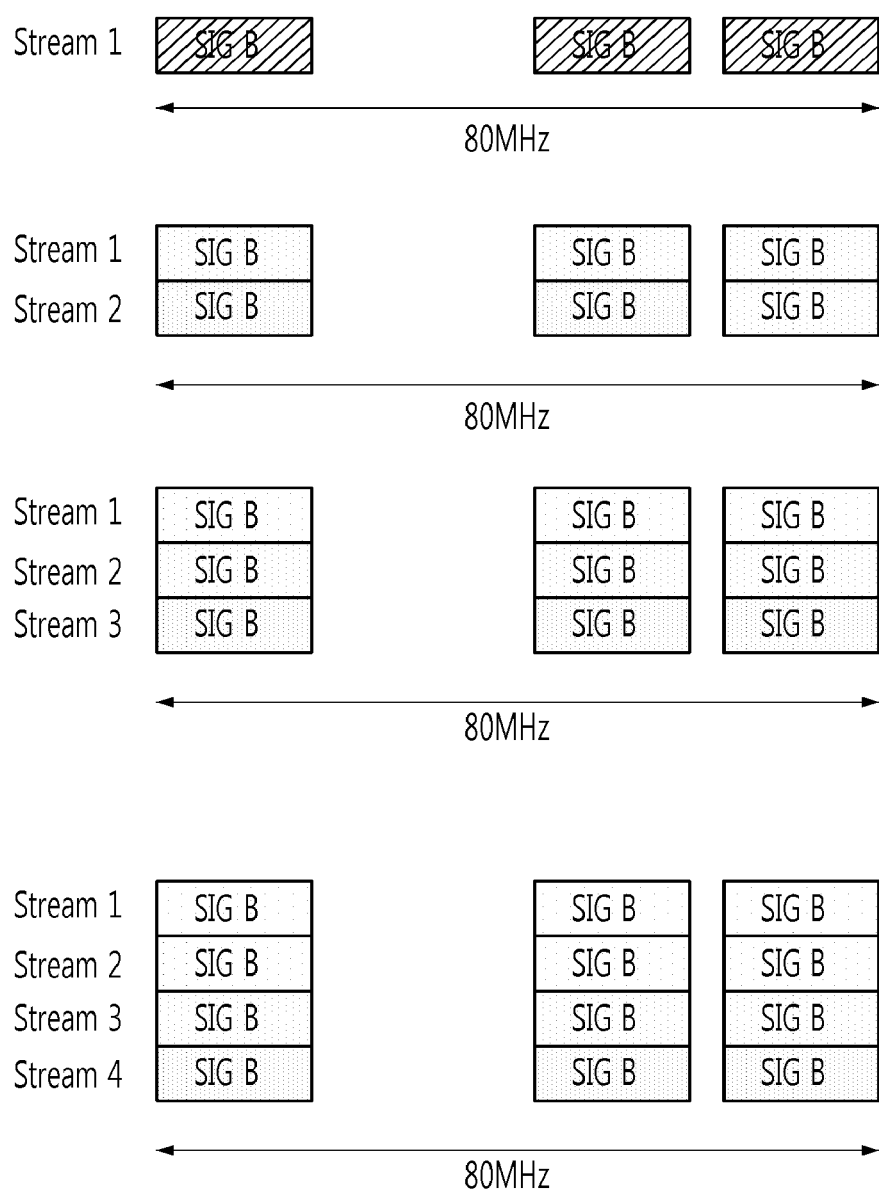
FIG. 31 shows an embodiment of applying the data transmission method according to the present invention to a case in which data is transmitted via three non-contiguous multi-channels by using one QPSK symbol in an 80 MHz frequency band.

The transmission method according to an embodiment of the present invention as described above can be applicable when the VHT-SIG B field uses one QPSK symbol instead of two BPSK symbols. FIG. 27 shows an embodiment of applying the data transmission method according to the present invention to a case in which data is transmitted by using one QPSK symbol in a 20 MHz frequency band. FIG. 28 shows an embodiment of applying the data transmission method according to the present invention to a case in which data is transmitted by using one QPSK symbol in a 40 MHz frequency band. FIG. 29 shows an embodiment of applying the data transmission method according to the present invention to a case in which data is transmitted by using one QPSK symbol in an 80 MHz frequency band. FIG. 30 shows an embodiment of applying the data transmission method according to the present invention to a case in which data is transmitted via two non-contiguous multi-channels by using one QPSK symbol in an 80 MHz frequency band. FIG. 31 shows an embodiment of applying the data transmission method according to the present invention to a case in which data is transmitted via three non-contiguous multi-channels by using one QPSK symbol in an 80 MHz frequency band. Different interleaving may be applied to each stream of FIGS. 27, 28, 29, 30, and 31.

The transmission method according to an embodiment of the present invention as described above can be applicable when one stream is transmitted as a space-time block code (STBC) (or an Alamouti code) through two antennas. In this case, the VHT-SIG B field may be transmitted as the STBC in the same manner as that of the data field, or the VHT-SIG B field may be transmitted by using one of two space-time streams. In the former case, STBC-related information should be included in the VHT-SIG A in advance and transmitted, and in the latter case, the STBC-related information may be included in the VHT-SIG B and transmitted.

Figure 32:
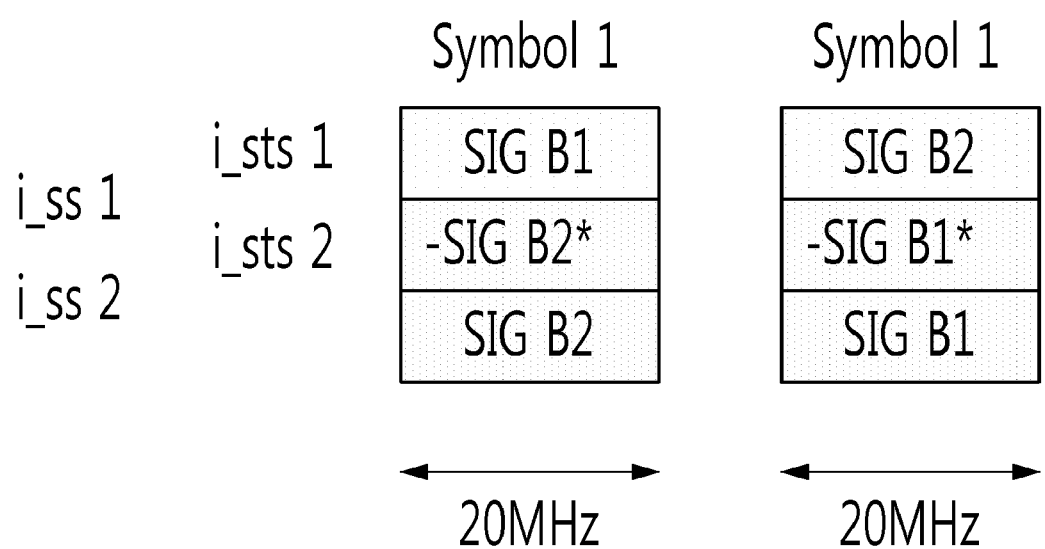
FIG. 32 shows an embodiment of applying the data transmission method according to the present invention to a case in which a first stream is transmitted by using two space-time streams and a second stream is transmitted as it is in a 20 MHz frequency band.
Figure 33:
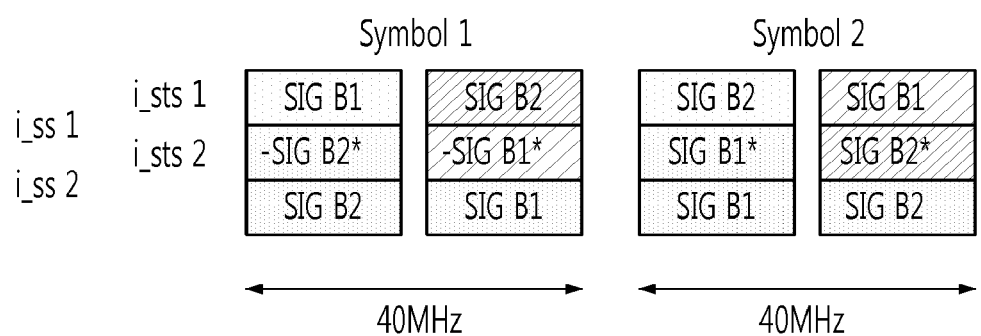
FIG. 33 shows an embodiment of applying the data transmission method according to the present invention to a case in which a first stream is transmitted by using two space-time streams and a second stream is transmitted as it is in a 40 MHz frequency band.

FIG. 32 shows an embodiment of applying the data transmission method according to the present invention to a case in which a first stream is transmitted by using two space-time streams and a second stream is transmitted as it is in a 20 MHz frequency band. FIG. 33 shows an embodiment of applying a data transmission method according to the present invention to a case in which a first stream is transmitted by using two space-time streams and a second stream is transmitted as it is in a 40 MHz frequency band.

Figure 34:
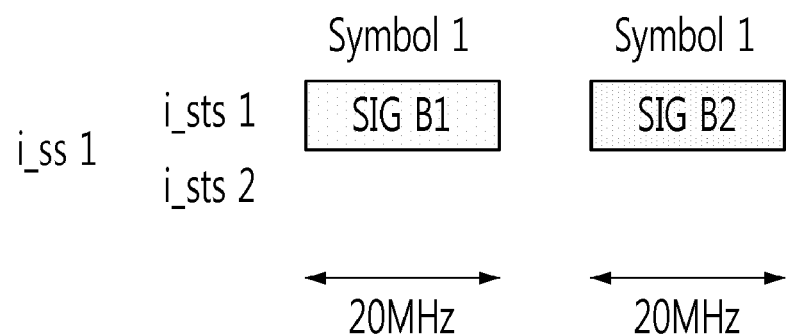
FIG. 34 shows an embodiment of applying the data transmission method according to the present invention to a case in which one stream is transmitted by using two space-time streams in a 20 MHz frequency band.
Figure 35:
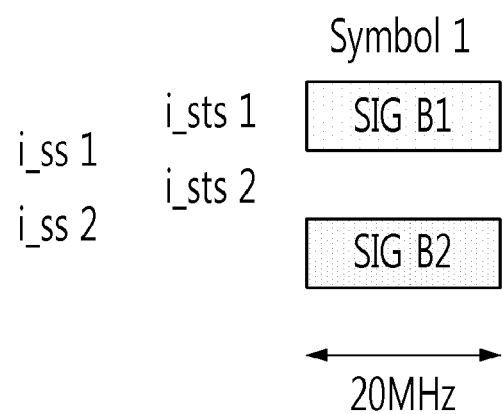
FIG. 35 shows an embodiment of applying the data transmission method according to the present invention to a case in which a first stream is transmitted by using two space-time streams and a second stream is transmitted as it is in a 20 MHz frequency band.
Figure 36:
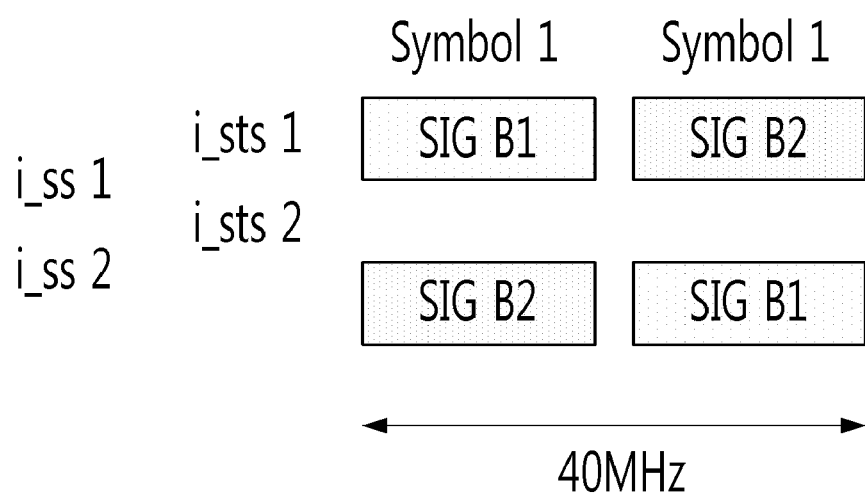
FIG. 36 shows an embodiment of applying the data transmission method according to the present invention to a case in which a first stream is transmitted by using two space-time streams and a second stream is transmitted as it is in a 40 MHz frequency band.

FIG. 34 shows an embodiment of applying the data transmission method according to the present invention to a case in which one stream is transmitted by using two space-time streams in a 20 MHz frequency band. FIG. 35 shows an embodiment of applying the data transmission method according to the present invention to a case in which a first stream is transmitted by using two space-time streams and a second stream is transmitted as it is in a 20 MHz frequency band. FIG. 36 shows an embodiment of applying the data transmission method according to the present invention to a case in which a first stream is transmitted by using two space-time streams and a second stream is transmitted as it is in a 40 MHz frequency band. In the embodiment of FIG. 36, the streams can be effectively transmitted by using one symbol.

The data transmission method according to an embodiment of the present invention as described above may also be applicable when only a portion of a stream is transmitted by using the STBC. The data transmission method according to an embodiment of the present invention as described above may also be applicable when the VHT-SIG B uses three or more OFDM symbols in transmitting one stream in a 20 MHz band.

A data transmission and reception method according to another embodiment of the present invention will now be described.

As described above, in an embodiment of the present invention, a dedicated signal field is iteratively effectively transmitted in a frequency or stream domain, to thus obtain a maximum diversity gain. This method can be applicable to a case in which a frame is transmitted by using channel bonding in a 40 MHz or 80 MHz bandwidth.

When two 20 MHz frequency bands are bonded to form a 40 MHz frequency band, a portion of a frequency tone, which is generally used as a guard band, or the like, can be used as a frequency tone for a data transmission. For example, in the case of 802.11n, the number of data transmission frequency tones in the 20 MHz band is 52, and the number of data transmission frequency tones in the 40 MHz band is 108. Namely, in 802.11n, the use of channel bonding results in an increase in the number of four data transmission frequency tones in the 40 MHz band. Thus, the number of transmission frequency tones can be further increased in an 80 MHz band by using channel bonding based on the same principle.

The foregoing VHT-SIG B field transmission scheme of the present invention can be applicable to a frame transmission using channel bonding. Here, the increased data transmission frequency tones can be used to increase the amount of data included in a signal field or the iteration number of signal fields. Namely, the method according to the present invention can be applicable even to a case in which the number of bits of the SIG B in the 40 MHz band or the 80 MHz band is greater than the number of bits of the SIG B in the 20 MHz band.

Figure 37:
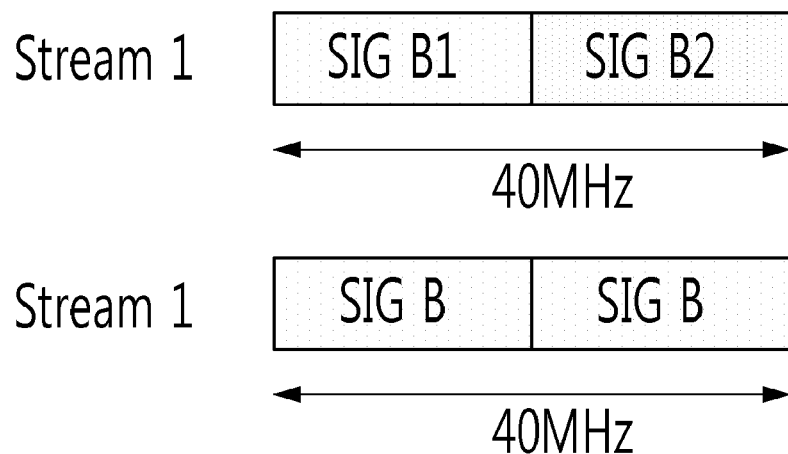
FIG. 37 shows an embodiment of applying the data transmission method according to the present invention to a case in which a station (STA) receives one stream in a 40 MHz frequency band.

FIG. 37 shows an embodiment of applying the data transmission method according to the present invention to a case in which a station (STA) receives one stream in a 40 MHz frequency band. FIG. 38 shows an embodiment of applying the data transmission method according to the present invention to a case in which a station (STA) receives two streams in a 40 MHz frequency band. FIG. 39 shows an embodiment of applying the data transmission method according to the present invention to a case in which a station (STA) receives three streams in a 40 MHz frequency band. FIG. 40 shows an embodiment of applying the data transmission method according to the present invention to a case in which a station (STA) receives four streams in a 40 MHz frequency band. Different interleaving may be applied to each stream of FIGS. 37, 38, 39, and 40.

Figure 41:
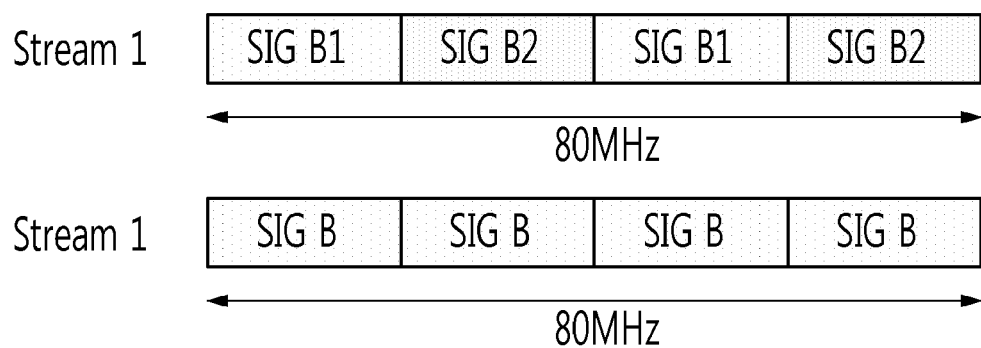
FIG. 41 shows an embodiment of applying the data transmission method according to the present invention to a case in which a station (STA) receives one stream in an 80 MHz frequency band.

FIG. 41 shows an embodiment of applying the data transmission method according to the present invention to a case in which a station (STA) receives one stream in an 80 MHz frequency band. FIG. 42 shows an embodiment of applying the data transmission method according to the present invention to a case in which a station (STA) receives two streams in an 80 MHz frequency band. FIG. 43 shows an embodiment of applying the data transmission method according to the present invention to a case in which a station (STA) receives three streams in an 80 MHz frequency band. FIG. 44 shows an embodiment of applying the data transmission method according to the present invention to a case in which a station (STA) receives four streams in an 80 MHz frequency band. Different interleaving may be applied to each stream of FIGS. 41, 42, 43, and 44.

When the number of bits of the SIG B and the number of frequency tones used in transmission are not in a mutually multiple relationship, some frequency tones may remain after iterating the SIG B. In this case, a method of iterating only a portion of the SIG B or padding may be used. This method can be applicable when the information of SIG B is increased according to an increase in the frequency bandwidth from 20 MHz to 40 MHz and to 80 MHz.

In general, when the frequency bandwidth is increased, the amount of data transmitted in the same duration is increased. Accordingly, when length information of transmitted data, or the like, is included in the VHT-SIG B and transmitted, the length of the VHT-SIG B itself is increased. In this case, a bit allocation of the VHT-SIG B is changed by frequency bandwidth and the VHT-SIG B may be iterated according to the number of transmittable frequency tones, thus enhancing transmission efficiency. For example, it is assumed that the number of available data tones in a 20 MHz band is 26 bits, the number of available data tones in a 40 MHz band is 54 bits, and the number of available data tones in an 80 MHz band is 117 bits. In this case, the length of the VHT-SIG B is 26 bits in the 20 MHz band, 27 bits in the 40 MHz band, and 29 bits in the 80 MHz band. FIG. 45 shows a bit allocation in this case.

Figure 46:
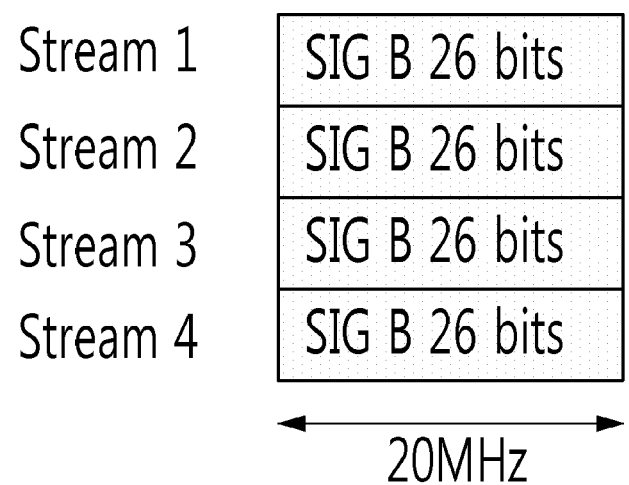
FIG. 46 shows an embodiment of applying the data transmission method according to the present invention to a case in which a station (STA) receives four streams in a 20 MHz frequency band, when the numbers of bits of the VHT-SIG B are allocated as shown in FIG. 45.
Figure 47:
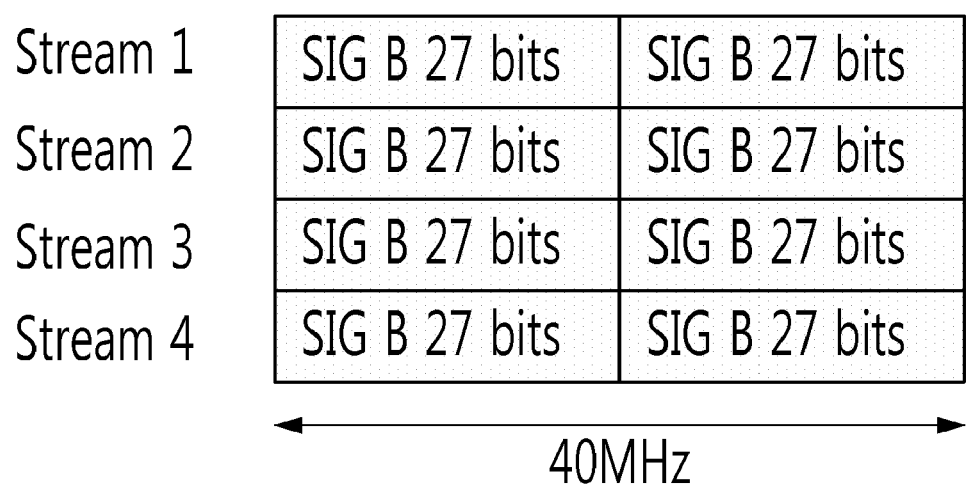
FIG. 47 shows an embodiment of applying the data transmission method according to the present invention to a case in which a station (STA) receives four streams in a 40 MHz frequency band, when the numbers of bits of the VHT-SIG B are allocated as shown in FIG. 45.

FIG. 46 shows an embodiment of applying the data transmission method according to the present invention to a case in which a station (STA) receives four streams in a 20 MHz frequency band, when the numbers of bits of the VHT-SIG B are allocated as shown in FIG. 45. FIG. 47 shows an embodiment of applying the data transmission method according to the present invention to a case in which a station (STA) receives four streams in a 40 MHz frequency band, when the numbers of bits of the VHT-SIG B are allocated as shown in FIG. 45. FIG. 48 shows an embodiment of applying the data transmission method according to the present invention to a case in which a station (STA) receives four streams in an 80 MHz frequency band, when the numbers of bits of the VHT-SIG B are allocated as shown in FIG. 45. Different interleaving may be applied to each stream of FIGS. 46, 47, and 48. The present invention can be applicable even when the number of transmitted streams is changed in the embodiments of FIGS. 46, 47, and 48.

The bit allocation of VHT-SIG B in FIG. 45 includes tail bits for a convolutional code. However, the VHT-SIG B of FIG. 45 does not include CRC bits for determining whether or not a codeword has an error, making it difficult to obtain reliability of data. However, in the case of 20 MHz band, since there is no extra bit in the VHT-SIG B, some (4 to 8 bits) of the reserved bits included in a service field of a data field may be used as the CRC bit as shown in FIG. 49.

Figure 49:
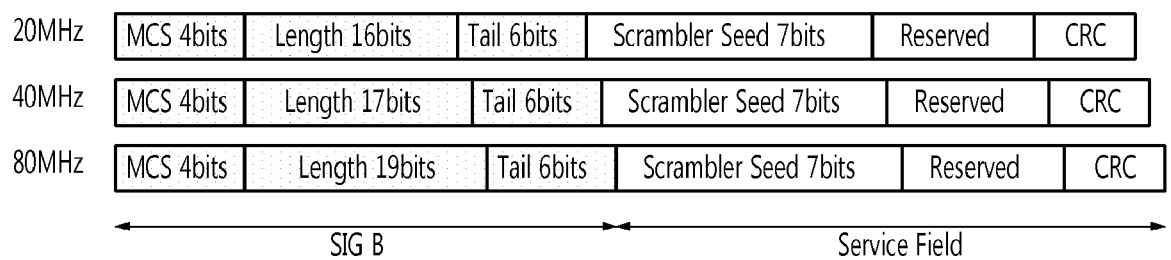
FIG. 49 shows an embodiment in which the VHT-SIG B has a length of 26 bits in a 20 MHz band, 27 bits in a 40 MHz band, and 29 bits in an 80 MHz band, and some of the reserved bits included in a service field are used as CRC bits.

When the bit allocation as shown in FIG. 49 is used, the CRC is simultaneously applied to the SIG B and a scrambler seed. Thus, CRC calculation with respect to a variable length is required for each frequency band. The VHT-SIG B field uses a low modulations scheme and coding rate (BPSK 1/2), and is available for an iterative coding to frequency and an antenna domain, so it has high reliability. Meanwhile, the service field uses the modulation scheme and coding rate used for transmission of data, as it is, so its reliability is relatively variable and generally has low reliability compared with the VHT-SIG B. In this case, the use of a CRC can detect an error of information included in the VHT-SIG B field and an error of a scrambler seed. Thus, when an error of the scrambler seed is detected, the operation of PHY and MAC layers can be stopped, obtaining an effect of reducing power consumption.

The foregoing method can be applicable to SU-MIMO. In SU-MIMO, the VHT-SIG A may relatively have extra bits. Thus, in SU-MIMO, the MCS bits, which are included in the VHT-SIG B field, can be included in the VHT-SIG A field. In SU-MIMO, the number of antennas in use may be increased, so the number of bits of the field indicating a data length may be increased. FIG. 50 shows a bit allocation of the VHT-SIG B when the VHT-SIG B has a length of 26 bits in a 20 MHz band, 27 bits in a 40 MHz band, and 29 bits in a 80 MHz band in SU-MIMO.

Figure 51:
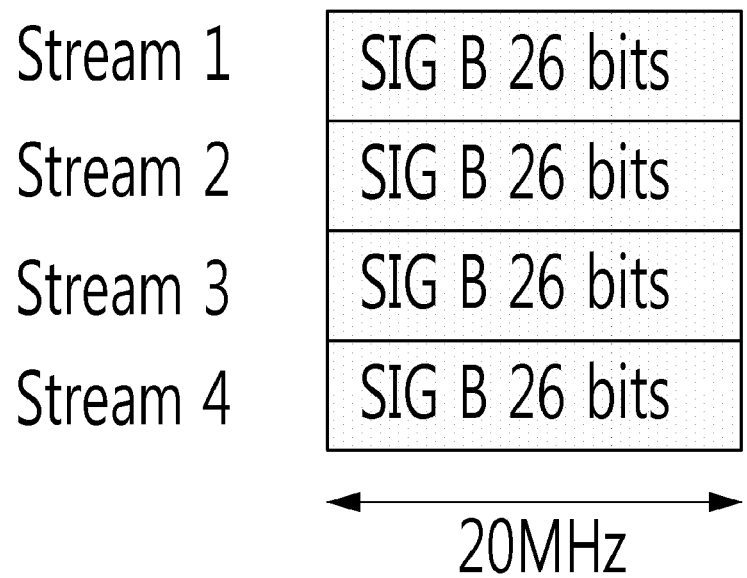
FIG. 51 shows an embodiment of applying the data transmission method according to the present invention to a case in which a station (STA) receives four streams in a 20 MHz frequency band, when the numbers of bits of the VHT-SIG B are allocated as shown in FIG. 50.
Figure 52:
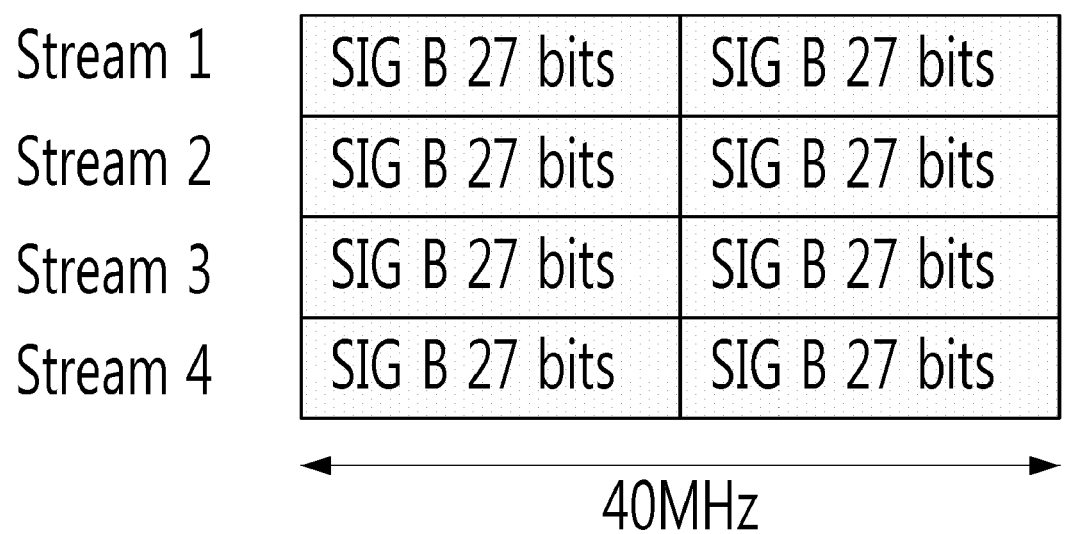
FIG. 52 shows an embodiment of applying the data transmission method according to the present invention to a case in which a station (STA) receives four streams in a 40 MHz frequency band, when the numbers of bits of the VHT-SIG B are allocated as shown in FIG. 50.

FIG. 51 shows an embodiment of applying a data transmission method according to the present invention to a case in which a station (STA) receives four streams in a 20 MHz frequency band, when the numbers of bits of the VHT-SIG B are allocated as shown in FIG. 50. FIG. 52 shows an embodiment of applying a data transmission method according to the present invention to a case in which a station (STA) receives four streams in a 40 MHz frequency band, when the numbers of bits of the VHT-SIG B are allocated as shown in FIG. 50. FIG. 53 shows an embodiment of applying a data transmission method according to the present invention to a case in which a station (STA) receives four streams in an 80 MHz frequency band, when the numbers of bits of the VHT-SIG B are allocated as shown in FIG. 50. Different interleaving may be applied to each stream of FIGS. 51, 52, and 53. The present invention can be applicable even when the number of transmitted streams is changed in the embodiments of FIGS. 51, 52, and 53.

When the bit allocation of VHT-SIG B field as shown in FIG. 50 is used, the VHT-SIG B field includes tail bits for a convolutional code. However, the VHT-SIG B of FIG. 50 does not include a CRC bits for determining whether or not a codeword has an error, making it difficult to obtain reliability of data. However, in the case of 20 MHz band, since there is no extra bit in the VHT-SIG B, some (4 to 8 bits) of the reserved bits included in a service field of a data field may be used as the CRC bit as shown in FIG. 54.

Figure 54:
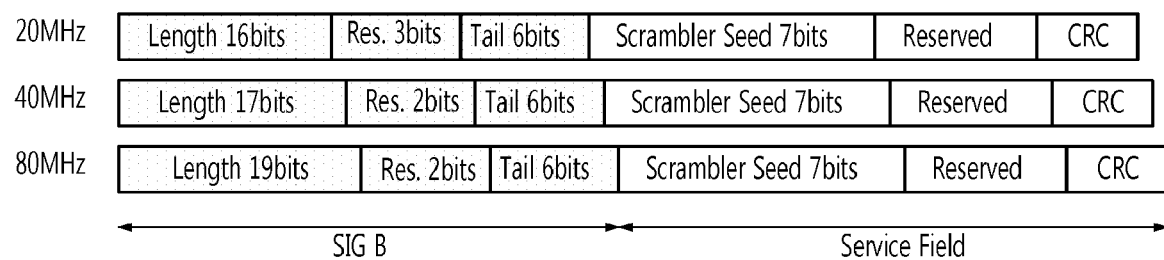
FIG. 54 shows an embodiment in which the VHT-SIG B has a length of 26 bits in a 20 MHz band, 27 bits in a 40 MHz band, and 29 bits in an 80 MHz band, and some of the reserved bits included in a service field are used as CRC bits.

When the bit allocation as shown in FIG. 54 is used, the CRC is simultaneously applied to the SIG B and a scrambler seed. Thus, CRC calculation with respect to a variable length is required for each frequency band. The VHT-SIG B field uses a low modulations scheme and coding rate (BPSK 1/2), and is available for an iterative coding to frequency and an antenna domain, so it has high reliability. Meanwhile, the service field uses the modulation scheme and coding rate used for transmission of data, as it is, so its reliability is relatively variable and generally has low reliability compared with the VHT-SIG B. In this case, the use of a CRC can detect an error of information included in the VHT-SIG B field and an error of a scrambler seed. Thus, when an error of the scrambler seed is detected, the operation of PHY and MAC layers can be stopped, obtaining an effect of reducing power consumption.

In the data transmission and reception method according to the present invention as described above, when the VHT-SIG B field is transmitted, different interleaving is applied to the frequency domain with respect to mutually different transmission streams, thereby obtaining a maximum diversity gain even in the antenna domain. In this respect, however, in order to obtain similar effects while slightly reducing the complexity, cyclic delay diversity (CDD) technique may be used to transmit the VHT-SIG B field, without applying different interleaving to each transmission stream. In this case, the same data is transmitted by each transmission antenna, and here, a different delay is applied to each antenna.

Figure 55:
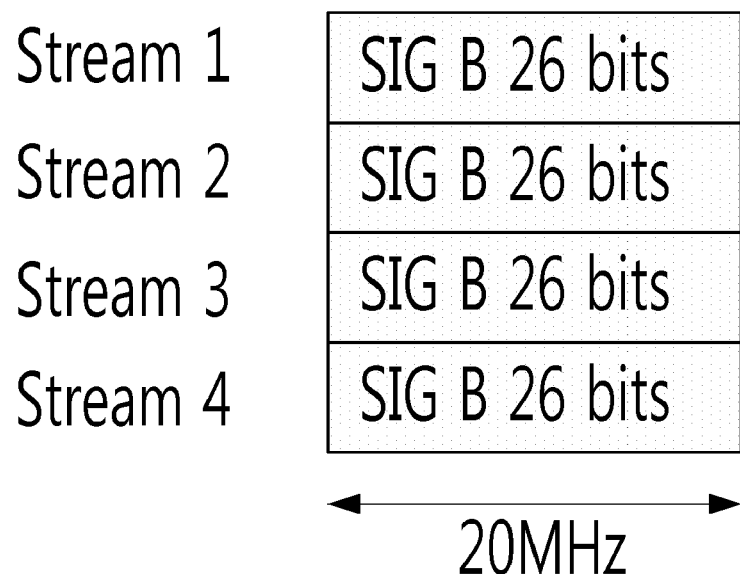
FIG. 55 shows an embodiment of applying the data transmission method according to the present invention to a case in which a station (STA) receives four streams in a 20 MHz frequency band, when cyclic delay diversity (CDD) technique is used and different delay is applied to each antenna.
Figure 56:
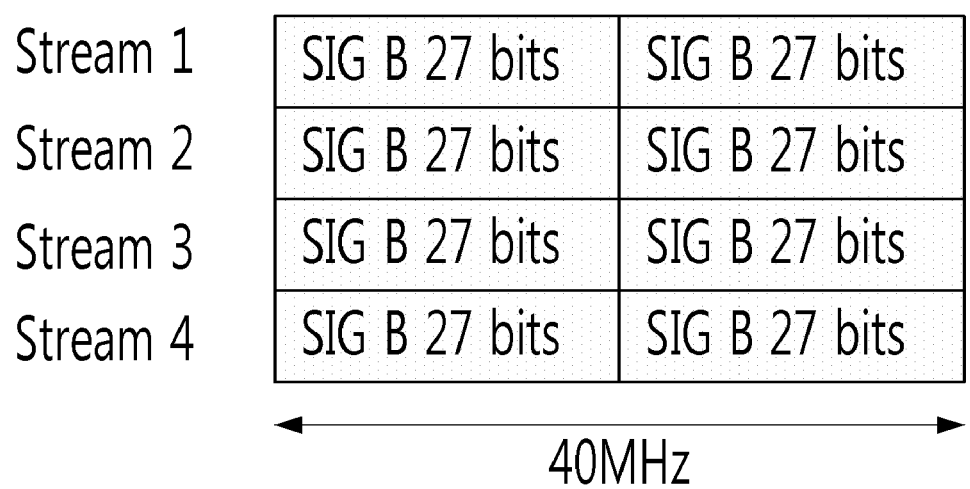
FIG. 56 shows an embodiment of applying the data transmission method according to the present invention to a case in which a station (STA) receives four streams in a 40

FIG. 55 shows an embodiment of applying the data transmission method according to the present invention to a case in which a station (STA) receives four streams in a 20 MHz frequency band, when cyclic delay diversity (CDD) technique is used and different delay is applied to each antenna. FIG. 56 shows an embodiment of applying the data transmission method according to the present invention to a case in which a station (STA) receives four streams in a 40 MHz frequency band, when a CDD technique is used and different delay is applied to each antenna. FIG. 57 shows an embodiment of applying the data transmission method according to the present invention to a case in which a station (STA) receives four streams in an 80 MHz frequency band, when a CDD technique is used and different delay is applied to each antenna. Different delay is applied to each stream of FIGS. 55, 56, and 57. The present invention can be applicable even when the number of transmitted streams is changed in the embodiments of FIGS. 55, 56, and 57.

Also, spreading matrix to the antenna domain having a size of (number of transmission antennas and number of transmission antennas) may be additionally applicable to the VHT-SIG B transmission scheme of the present invention. When different interleaving is applied to each stream, the spreading matrix when multi-stream is applied can be applicable, and when each stream is transmitted by applying delay thereto, the spreading matrix when a single stream is applied can be applicable.

FIG. 58 shows the configuration of a transmission terminal according to an embodiment of the present invention.

A transmission terminal 5802 includes a signal field generation unit 5804, a data field generation unit 5806, a data frame generation unit 5808, and a transmission unit 5810. The signal field generation unit 5804 iteratively generates a signal field according to a frequency band applied to transmission of a data frame. The data field generation unit 5806 generates a data field including data to be transmitted to a reception terminal. The data frame generation unit 5808 generates a data frame including the signal field generated by the signal field generation unit 5804 and the data field generated by the data field generation unit 5806. The transmission unit 5810 transmits the data frame generated by the data frame generation unit 5808 to the reception terminal.

Here, the signal field may include a length field indicating the length of a data field, and the length field may have a length which differs according to a frequency band applied to transmission of a data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

FIG. 59 shows the configuration of a reception terminal according to an embodiment of the present invention.

A reception terminal 5902 includes a reception unit 5904 and a data obtaining unit 5906. The reception unit 5904 receives a data frame including a signal field and a data field.

Here, the signal field may include a length field indicating the length of a data field, and the length field may have a length which differs according to a frequency band applied to transmission of a data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

The data obtaining unit 5906 obtains data included in the data field by using the signal field included in the received data frame. Here, the data obtaining unit 5906 may obtain the data by using the length field, the MCS field, or the like, included in the signal field. Also, the data obtaining unit 5906 may detect an error of the signal field by using the CRC field included in the data frame.

FIG. 60 is a flowchart illustrating the process of a method for transmitting data by a transmission terminal according to an embodiment of the present invention.

First, a signal field is iteratively generated according to a frequency band applied to transmission of a data frame (6002). Also, a data field including data to be transmitted to a reception terminal is generated (6004). And then, a data frame including the generated signal field and data field is generated (6006). Thereafter, the generated data frame is transmitted to a reception terminal (6008).

Here, the signal field may include a length field indicating the length of the data field, and the length field may have a length which differs according to a frequency band applied to transmission of the data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

FIG. 61 is a flow chart illustrating the process of a method for receiving data by a reception terminal according to an embodiment of the present invention.

First, a data frame including a signal field and a data field is received (6102). Here, the signal field may include a length field indicating the length of the data field, and the length field may have a length which differs according to a frequency band applied to transmission of the data frame. Also, the signal field may include a modulation and coding scheme (MCS) field indicating a modulation method and a coding method of the data field. Also, the signal field may be a dedicated signal field for transferring information regarding each user. The data frame may include a cyclic redundancy check (CRC) field for detecting an error of the signal field.

And then, data included in the data field is obtained by using the signal field included in the received data frame (6104). In this case, the reception terminal may obtain data by using the length field, the MCS field, or the like, included in the signal field. Also, the reception terminal may detect an error of the signal field by using a CRC field included in the data frame.

According to embodiments of the present invention, when a dedicated signal field is transmitted in the MU-MIMO system, the performance of the signal field is enhanced and a transmission time is reduced by utilizing the user frequency band and the number of streams, whereby a large amount of information can be effectively transmitted by using the signal field.

Although the present invention has been described with reference to exemplary embodiments and the accompanying drawings, it would be appreciated by those skilled in the art that the present invention is not limited thereto but various modifications and alterations might be made without departing from the scope defined in the claims and their equivalents.

The invention claimed is:

1. A communication method, comprising:
   determining a bandwidth of a communication channel;
   receiving at least a part of a frame through the communication channel, wherein the frame comprises a first field and a second field, wherein the first field precedes the second field, wherein the first field comprises a first set of bits indicating a length of data, and the second comprises the data;
   determining a number of bits of the first set of bits based on the bandwidth of the communication channel; and
   determining the length of the data based on the first set of bits.

2. The communication method of claim 1, wherein the frame further comprises a third field and a fourth field, wherein the third field precedes the fourth field, and the fourth field precedes the first field, wherein each of the first, third and fourth fields comprises control information for the frame.

3. The communication method of claim 2, wherein the third field comprises a legacy signal (L-SIG) field, the fourth field comprises a Very High Throughput Signal A (VHT-SIG-A) field, and the first field comprises a Very High Throughput Signal B (VHT-SIG-B) field.

4. The communication method of claim 3, wherein the second field further comprises a cyclic redundancy check (CRC) information related to the first field.

5. The communication method of claim 4, wherein the bandwidth of the communication channel is $20*2^{(n-1)}$ MHz, n is an integer greater than 0, and the first set of bits is repeated $2^{(n-1)}$ times in the VHT-SIG-B field.

6. A communication method, comprising:
determining a bandwidth of a communication channel;
determining a number of bits of a first set of bits based on the bandwidth of the communication channel;
determining a length of data;
determining the first set of bits based on the length of the data;
generating a frame comprising a first field and a second field, wherein the first field precedes the second field, wherein the first field comprises the first set of bits, and the second field comprises the data; and
transmitting the frame.

7. The communication method of claim 6, wherein the frame further comprises a third field and a fourth field, wherein the third field precedes the fourth field, and the fourth field precedes the first field, wherein each of the first, third and fourth fields comprises control information for the frame.

8. The communication method of claim 7, wherein the third field comprises a legacy signal (L-SIG) field, the fourth field comprises a Very High Throughput Signal A (VHT-SIG-A) field, and the first field comprises a Very High Throughput Signal B (VHT-SIG-B) field.

9. The communication method of claim 8, wherein the second field further comprises a cyclic redundancy check (CRC) information related to the first field.

10. The communication method of claim 9, wherein the bandwidth of the communication channel is $20*2^{(n-1)}$ MHz, n is an integer greater than 0, and the first set of bits is repeated $2^{(n-1)}$ times in the VHT-SIG-B field.

11. A station, comprising:
a circuitry which is configured to:
determine a bandwidth of a communication channel;
determine a number of bits of a first set of bits based on the bandwidth of the communication channel;
determine a length of data;
determine the first set of bits based on the length of the data;
cause the station to generate a frame comprising a first field and a second field, wherein the first field precedes the second field, wherein the first field comprises the first set of bits, and the second field comprises the data; and
cause the station to transmit the frame.

12. The station of claim 11, wherein the frame further comprises a third field and a fourth field, wherein the third field precedes the fourth field, and the fourth field precedes the first field, wherein each of the first, third and fourth fields comprises control information for the frame.

13. The station of claim 12, wherein the third field comprises a legacy signal (L-SIG) field, the fourth field comprises a Very High Throughput Signal A (VHT-SIG-A) field, and the first field comprises a Very High Throughput Signal B (VHT-SIG-B) field.

14. The station of claim 13, wherein the second field further comprises a cyclic redundancy check (CRC) information related to the first field.

15. The station of claim 14, wherein the bandwidth of the communication channel is $20*2^{(n-1)}$ MHz, n is an integer greater than 0, and the first set of bits is repeated $2^{(n-1)}$ times in the VHT-SIG-B field.

16. A communication device for a station, the communication device comprising:
a circuitry which is configured to:
determine a bandwidth of a communication channel;
determine a number of bits of a first set of bits based on the bandwidth of the communication channel;
determine a length of data;
determine the first set of bits based on the length of the data;
cause the station to generate a frame comprising a first field and a second field, wherein the first field precedes the second field, wherein the first field comprises the first set of bits, and the second field comprises the data; and
cause the station to transmit the frame.

17. The communication device of claim 16, wherein the frame further comprises a third field and a fourth field, wherein the third field precedes the fourth field, and the fourth field precedes the first field, wherein each of the first, third and fourth field comprises control information for the frame.

18. The communication device of claim 17, wherein the third field comprises a legacy signal (L-SIG) field, the fourth field comprises a Very High Throughput Signal A (VHT-SIG-A) field, and the first field comprises a Very High Throughput Signal B (VHT-SIG-B) field.

19. The communication device of claim 18, wherein the second field further comprises a cyclic redundancy check (CRC) information related to the first field.

20. The communication device of claim 19, wherein the bandwidth of the communication channel is $20*2^{(n-1)}$ MHz, n is an integer greater than 0, and the first set of bits is repeated $2^{(n-1)}$ times in the VHT-SIG-B field.

* * * * *